United States Patent
Murdoch et al.

(10) Patent No.: US 11,550,892 B2
(45) Date of Patent: Jan. 10, 2023

(54) PRESENTATION OF A VERIFIABLE CREDENTIAL HAVING USAGE DATA

(71) Applicant: Microsoft Technology Licensing, LLC, Redmond, WA (US)

(72) Inventors: Brandon Murdoch, Reading (GB); Frank Michael Chiachiere, Seattle, WA (US); Ankur Patel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 16/804,739

(22) Filed: Feb. 28, 2020

(65) Prior Publication Data

US 2021/0271744 A1     Sep. 2, 2021

(51) Int. Cl.
*G06F 21/36* (2013.01)
*G06F 21/34* (2013.01)
*G06F 16/23* (2019.01)
*G06K 7/14* (2006.01)

(52) U.S. Cl.
CPC .......... *G06F 21/34* (2013.01); *G06F 16/2379* (2019.01); *G06F 21/36* (2013.01); *G06K 7/1413* (2013.01); *G06K 7/1417* (2013.01)

(58) Field of Classification Search
CPC .............................. G06F 21/36; G06K 7/1417
USPC .................................................. 235/487, 494
See application file for complete search history.

(56) References Cited

U.S. PATENT DOCUMENTS

| 10,440,014 B1* | 10/2019 | Hoyer | G06F 21/445 |
| 2014/0181927 A1* | 6/2014 | Sarkissian | H04L 63/083 |
| | | | 726/6 |
| 2017/0316390 A1* | 11/2017 | Smith | H04L 9/0637 |

OTHER PUBLICATIONS

"International Search Report and Written Opinion Issued in PCT Application No. PCT/US21/014424", dated Apr. 16, 2021, 11 Pages.
"Verifiable Credentials Data Model 1.0", Retrieved from: https://www.w3.org/TR/vc-data-model/, Nov. 19, 2019, 111 Pages.

* cited by examiner

*Primary Examiner* — Paultep Savusdiphol
(74) *Attorney, Agent, or Firm* — Workman Nydegger

(57) ABSTRACT

The presentation of a verifiable credential that is represented within a data structure that represents the verifiable credential as well as usage data of the verifiable credential. The usage of the verifiable credential is monitored, such that as usage of the verifiable credential changes or progresses, the stored usage data also changes. This data structure may be used to not only cause visual representations of the verifiable credential to be displayed to the user, but the user can selectively cause at least some of that usage data to also be presented to the user. Thus, the user can easily keep track of how their verifiable credential is being used, regardless of where or from which device the verifiable credential is presented.

13 Claims, 25 Drawing Sheets

FIG. 4F

Issue your card

Front of card

Verified Player
Subject Name

Contoso

Edit

Back of card

Data
Select data source

Benefits
Add card benefits

Issuer verification
Verify your organization

Card preview

400F

Contoso

Player Dashboard

*500B*

Hi, John Doe

Team
The Aces

Position
Pitcher

Player ID
123445

Status
Current

Hello, John

Get a Baseballer ID

Verify with
Authenticator
QR Code

Download Authenticator >

*FIG. 5B*

Contoso

*500C*

Player Dashboard

Hi, John Doe                                       Hello, John

Player ID
123445

Status
Current

Team
The Aces

Position
Pitcher

Get a Baseballer ID

[Verify with Authenticator — QR Code]

Download Authenticator >

---

9:41

< Scan QR Code

Scan a QR code to add or share a credential

[QR Code]

*FIG. 5C*

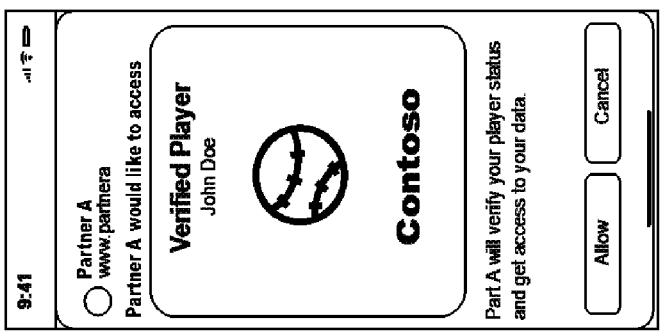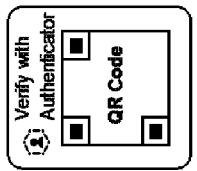
FIG. 6C

Portable Identity Cards - Accept cards

| | Transaction date | Card ID | Issuer | App | Response from Issuer |
|---|---|---|---|---|---|
| Overview | 23 August 2019 | did:ion:abc123 | Contoso | Data manager | Valid |
| Key stores | 23 August 2019 | did:ion:abc123 | Contoso | Data manager | Valid |
| Identifiers | 23 August 2019 | did:ion:abc123 | Contoso | Data manager | No response |
| Issue cards | 23 August 2019 | did:ion:abc123 | Contoso | Data manager | Valid |
| Accept cards | | | | | |
| Transaction history | | | | | |
| Cards I accept | | | | | |

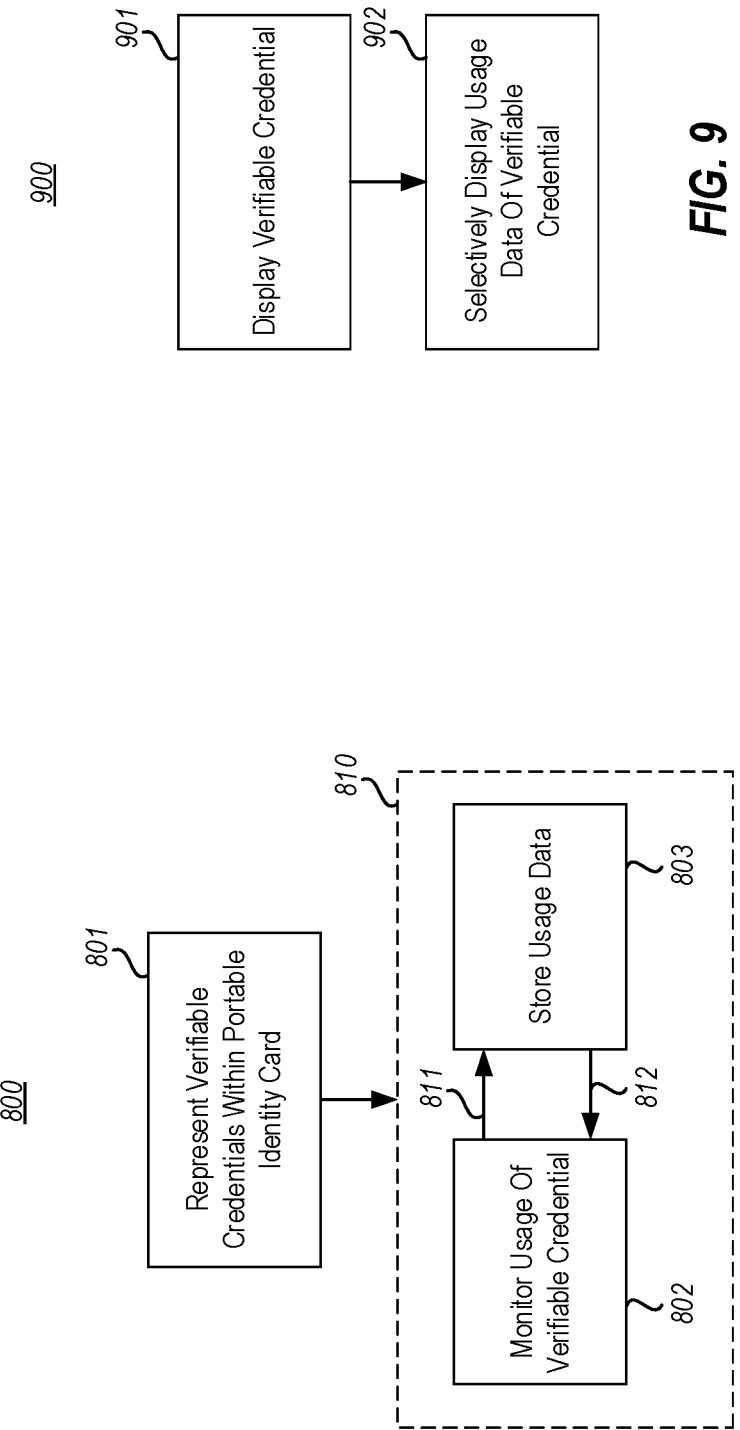

PRESENTATION OF A VERIFIABLE CREDENTIAL HAVING USAGE DATA

BACKGROUND

A digital identity is a mechanism to keep track of an entity across different digital contexts. After an identity is determined, appropriate action can be taken related to the entity that has the identity. As an example, authorizations, privileges, customizations and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Most currently used documents or records that prove identity are issued by centralized organizations, such as governments, corporations, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a more recent type of identifier. Decentralized identifiers are independent of any centralized registry, identity provider, or certificate authority. Distributed ledger technology (such as blockchain) provides the opportunity for using fully decentralized identifiers. Distributed ledger technology uses distributed ledgers to record transactions between two or more parties in a verifiable way. Once a transaction is recorded, the data in the section of ledger cannot be altered retroactively without the alteration of all subsequent sections of ledger. This provides a fairly secure platform in which it is difficult or impossible to tamper with data recorded in the distributed ledger. Since a DID is generally not controlled by a centralized management system, but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Existing computing technologies provide for a data structure called a "verifiable credential". In these technologies, a claims issuer makes one or more claims about a subject, and generates the verifiable credential. The verifiable credential include those claim(s) as well as proof instructions (e.g., metadata) to prove that claim(s) have not been tampered with and were indeed issued by the claims issuer. The claims issuer then provides the verifiable credential to a claims holder, for presentation to any relying party that relies upon the veracity of those claims.

As an example, the claims issuer might be a computing system associated with a government agency in charge of issuing driver licenses. The government agency may generate a verifiable credential with claims about a citizen, such as the birthdate, residence address, weight, eye color, hair color, authorization to drive, restrictions on authorization to drive, and so forth. The government agency issues the verifiable credential to the citizen. If the user is stopped by law enforcement, the citizen may present the verifiable credential, whereby a computing system associated with law enforcement may use the proof instructions to verify that the claims were issued by the government agency and indeed have not been tampered with since issuance. In another example, an organization that provides inoculations may issue claims to a parent of a child that assert that the child has received certain inoculations. The parent may then present these inoculation claims to a school where the child is to attend.

However, the inventors have recognized that portability of the verifiable credential is important in improving utility of the verifiable credential. As an example, such portability includes the ability to efficiently issue verifiable credentials to multiple holders, and the ability for any given holder to utilize the verifiable credential at different locations, and even with the verifiable credential being presented using multiple devices under the control of the holder. Tracking usage of a verifiable credential in such a manner can become quite difficult. However, there is presently no mechanism for keeping track of how a verifiable credential is being used, let alone how the verifiable credential is used if multiple devices are employed to present the verifiable credential.

Embodiments disclosed herein are related to presentation of a verifiable credential that is represented within a data structure that represents the verifiable credential as well as usage data of the verifiable credential. The usage of the verifiable credential is monitored, such that as usage of the verifiable credential changes or progresses, the stored usage data also changes. This data structure may be used to not only cause visual representations of the verifiable credential to be displayed to the user, but the user can selectively cause at least some of that usage data to also be presented to the user. Thus, the user can easily keep track of how their verifiable credential is being used, regardless of where or from which device the verifiable credential is presented.

In some embodiments, the usage data includes the frequency with which the verifiable credential is exposed to relying party computing systems, an identity of a relying party computing system to which the verifiable credential was last exposed, and/or a time that the verifiable credential was last exposed. Thus, the user may gain a comprehensive view of usage of the verifiable credential over time.

In some embodiments, at least one or some of the verifiable claims may have a subject referenced by a decentralized identifier. Thus, the principles described herein may be used to track usage of verifiable credentials that have claims about decentralized identities.

In some embodiments, the visual representation of the verifiable credential comprises a human readable visual representation of the property name and value for each of one, some, or potentially all of the verifiable claims within the verifiable credential. Alternatively, or in addition, the visual representation may comprise a machine-readable representation, such as a bar code or QR code, of the property name and value for each of one, some or all of the verifiable claims within the verifiable credential. Alternatively, or in addition, the proof instructions may also be presented in the visual representation in human-readable or machine-readable form. Thus, even without an electronic connection with the claim holder's computing system or device, humans or even machines may easily read and interpret what is being claimed, and the machine may additionally interpret how to prove that the claims have been made by the claims issuer and have not been tampered with since the time that the claims were made by the claims issuer.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIGS. 4A through 4F illustrate a sequence of user interfaces in which an issuer creates a portable identity card template that will be used to create portable identity cards for various holders;

FIGS. 5A through 5F illustrate a sequence of user interfaces in which a holder obtains a portable identity card generated from the portable identity card template of FIGS. 4A through 4F;

FIGS. 6A through 6C illustrate a sequence of user interfaces in which a holder presents the portable identity card to a relying party;

FIGS. 7A through 7C illustrate additional user interfaces that allow the user to manage portable identity cards;

FIG. 8 illustrates a flowchart of a method for presenting a verifiable credential, in accordance with the principles described herein;

FIG. 9 illustrates a flowchart of a method for using the portable identity card data structure, in accordance with the principles described herein;

DETAILED DESCRIPTION

The principles described herein relate to the use of a data structure that includes a verifiable credential as well as usage data for that verifiable credential. Verifiable credentials themselves are known in the art. One conventional implementation of a verifiable credential is described by as a W3C Recommendation dated Nov. 19, 2019 in a document entitled "Verifiable Credentials Data Model 1.0."

In order to introduce the reader to the concept of a verifiable credential, an example verifiable credential 100 will first be described with respect to FIG. 1. Furthermore, an environment 200 in which a verifiable credential is created and used will then be described with respect to FIG. 2. Thereafter, extending beyond the concept of a verifiable credential itself and into the embodiments herein, a portable identity card that includes a verifiable credential will be described with respect to FIG. 3. A use example of a portable identity card will thereafter be described with respect to FIGS. 4 through 7C. Thereafter, the principles of the embodiments herein will be described with respect to FIGS. 8 to 12.

As used herein, an "issuer" is an entity that makes at least one assertion about a subject. That assertion is also called herein a "claim". A "credential" is a set of one or more claims. As the term is used herein, a "credential" can include claims made by multiple issuers, but the term also applies to a set of claims having a single issuer as in the use example of FIGS. 4A through 7C. A "verifiable credential" is a credential in which cryptographic mechanisms (such as a digital signature) are used to detect whether the credential has been tampered with since the time that the credential was issued, and can be used to verify identity of the issuer of the credential. Claims within a verifiable credential need not be about the same subject, and the subject of any claim need not be the same as a holder of the verifiable credential.

Figure 1:
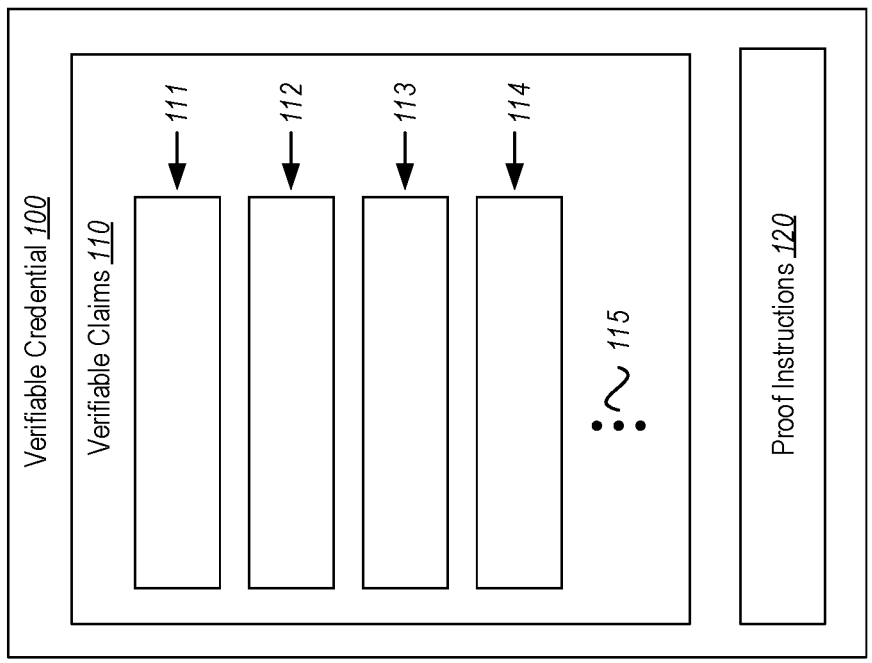
FIG. 1 illustrates a verifiable credential that includes multiple verifiable claims, and proof instructions for proving the claim were made by an issuer.

FIG. 1 illustrates a verifiable credential 100 that includes multiple verifiable claims 110. The verifiable claims 110 are shown as including four verifiable claims 111 through 114, though the ellipsis 115 represents that the verifiable credential 100 may include any number (one or more) of verifiable claims. The verifiable credential 110 also includes proof instructions 120 that are used to verify that the verifiable credential 100 has not been tampered with since the verifiable credential 100 was created by the issuer of the verifiable credential 100, and to verify the identity of the issuer of the verifiable claims 110. An example of a proof instruction is a digital signature of the issuer.

Figure 2:
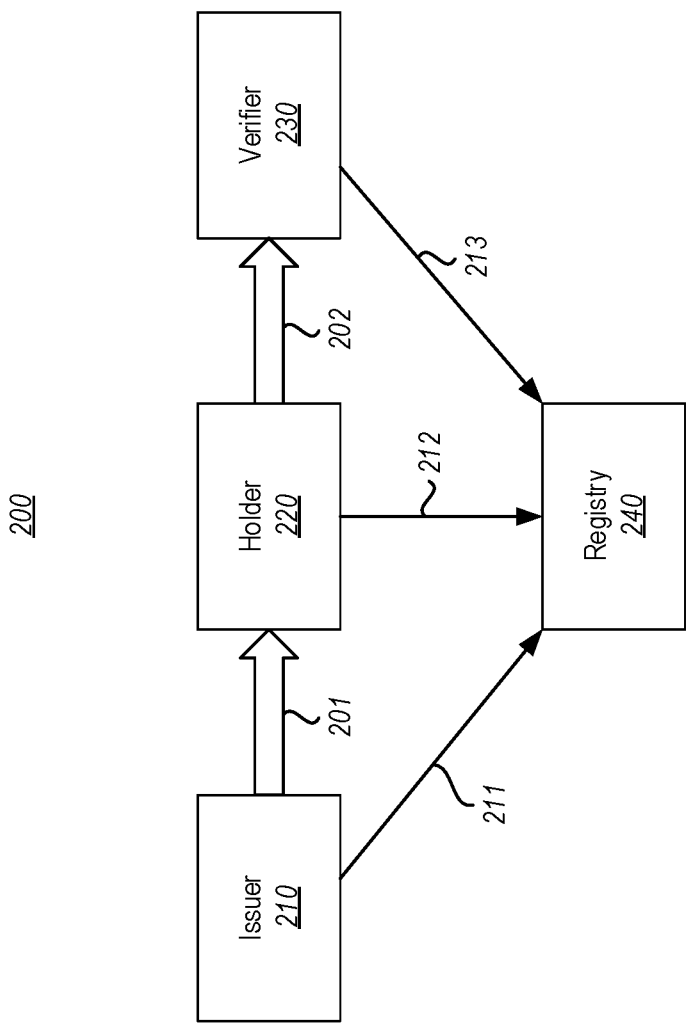
FIG. 2 illustrates an environment in which a verifiable credential (such as the verifiable credential of FIG. 1) is created and used.

FIG. 2 illustrates an environment 200 in which a verifiable credential (such as verifiable credential 100 of FIG. 1) is created and used. The environment 200 includes an issuer computing system 210 that operates within a sphere of trust of an issuer. Examples of issuers include corporations, organizations, associations, governments, agencies, individuals, or any other entity that can make assertions that could be relied upon by others. The issuer performs the role of asserting claims, causing the issuer computing system 210 to create a verifiable credential (such as verifiable credential 100 of FIG. 1) for these claims, and causing the issuer computing system 210 to transmit the verifiable credential to a holder computing system 220 as represented by arrow 201. The issuer computing system 210 may also be referred to herein as simply "issuer 210". As represented by arrow 211, the issuer 210 also transmits verify identifiers and use schemas to a registry computing system 240.

As also represented by arrow 201, a holder computing system 220 acquires the transmitted verifiable credential. The holder computing system 220 operates on behalf of a holder, who uses the holder computing system 220 to possess and potentially store the verifiable credential. As represented by arrow 202, the holder also causes the holder computing system to present the verifiable credential to a verifier computing system 230. The holder computing system 220 may also be referred to herein as simply "holder 220". As represented by arrow 212, the holder 220 also transmits identifiers and use schemas to the registry computing system 240.

The holder 220 presents the verifiable credential itself, or presents data from the verifiable credential in the form of another data structure, which may also be referred to herein as a "verifiable presentation". A verifiable presentation expresses data from one or more verifiable credentials, and is packaged in such a way that the authorship of the data is verifiable. If verifiable credentials are presented directly, they become verifiable presentations. Data formats derived from verifiable credentials that are cryptographically verifiable, but do not of themselves contain verifiable credentials, are also included within the definition of a verifiable presentation.

As also represented by the arrow 202, a verifier computing system 230 acquires the transmitted verifiable credential (optionally within a verifiable presentation). The verifier computing system 230 operates on behalf of a verifier, which is a relying party that relies on one or more claims made in the verifiable credential. The verifier computing system 230 evaluates whether a verifiable credential is an untampered with (and unexpired) statement of the issuer 210. This includes following any proof instructions (e.g., proof instructions 120) that are present within the verifiable credential (e.g., verifiable credential 100). The verifier computing system 230 then may take action based on this verification, such as treating the claim(s) made in the verifiable credential as being valid and issued by the issuer 210. The verifier computing system 230 will sometimes also be referred to hereinafter as "verifier 230". As part of the verification, the verifier 230 sends verify identifiers and schemas to the registry computing system 240, as represented by arrow 213.

The registry computing system 240 mediates the creation and verification of identifiers, keys, verifiable credential schemas, revocation registries, issuer public keys, and so on. Example verifiable data registries include trusted databases, decentralized databases, and distributed ledgers. Each of the issuer computing system 210, the holder computing system 220, the verifier computing system 230, and the registry computing system 240 is structured as described below for the computing system 1200 of FIG. 12.

Accordingly, FIGS. 1 and 2 describe verifiable credentials and dataflows associated with the creation and use of verifiable credentials. However, the inventors have recognized that portability of the verifiable credential is important in improving utility of the verifiable credential. As an example, such portability includes the ability to efficiently issue verifiable credentials to multiple holders, and the ability for any given holder to utilize the verifiable credential at different locations, and even with the verifiable credential being presented using multiple devices under the control of the holder (e.g., holder 220). Tracking usage of a verifiable credential in such a manner can become quite difficult. However, there is presently no mechanism for keeping track of how a verifiable credential is being used, let alone how the verifiable credential is used if multiple devices are employed to present the verifiable credential.

Figure 3:
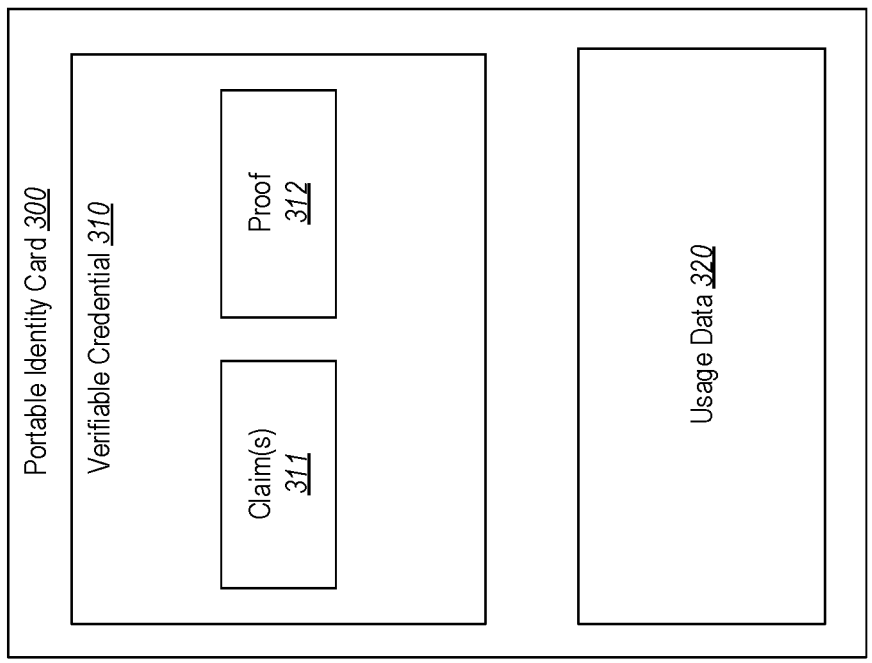
FIG. 3 illustrates a portable identity card data structure that includes a verifiable credential and usage data in accordance with the principles described herein.

FIG. 3 illustrates a data structure 300 that represents one example of how a portable identity card is represented in storage and/or memory of a computing system of a claims holder. The portable identity card data structure 300 includes a verifiable credential 310 as well as usage data 320 of that verifiable credential. The verifiable credential 310 includes one or more claims 311 as well as proof instructions 312 for verifying integrity of the claims, and validating that the claims were made by an issuer identified within the claims. Accordingly, in one example, the verifiable credential 310 is the verifiable credential 100 of FIG. 1.

The verifiable credential 310 is included in the portable identity card data structure 300 in the sense that the portable identity card data structure 300 is used to access the verifiable credential 310. In one example, the verifiable credential 310 is expressly included within the portable identity card data structure 300. Alternatively, the verifiable credential 310 is referenced in the portable identity card data structure 300. As an example, the portable identity card data structure 300 includes a pointer to (or an identifier of) the verifiable credential.

The same is true of the usage data 320. That is, in one example, the usage data 320 is included in the portable identity card data structure 300 in the sense that the portable identity card data structure 300 is used to access the usage data 320. In one example, the usage data 320 is expressly included within the portable identity card data structure 300. Alternatively, the usage data 320 is referenced in the portable identity card data structure 300. As an example, the portable identity card data structure 300 includes a pointer to (or an identifier of) the usage data 320.

The usage data 320 includes any historical information about how the verifiable credential is being used. As examples, the usage data includes frequency with which the verifiable credential is exposed to relying party computing systems, an identity of a relying party computing system to which the verifiable credential was last exposed, a time that the verifiable credential was last exposed, a device that was used to present the verifiable credential, and so forth.

The verifiable credential 310 is stored on the holder computing system, such as the holder 220 of FIG. 2. Alternatively, the verifiable credential 310 is stored in a way to be accessible by multiple different holder computing systems, each under the control of the same holder. As examples, the verifiable credential 310 can be stored in a centralized location, or in a decentralized distributed ledger, such as in a decentralized identifier (DID) document. As described below with respect to FIG. 10, content of a DID document is accessible by using a decentralized identifier (DID). Thus, in this embodiment, the holder computing system accesses the verifiable credential 310 from whatever holder computing system is in the control of the holder, by using the DID of the holder.

The portable identity card data structure 300 is stored on the holder computing system, such as the holder 220 of FIG. 2. Alternatively, the portable identity card data structure 300 is stored in a way to be accessible by multiple different holder computing systems, each under the control of the same holder. As examples, the portable identity card data structure 300 can be stored in a centralized location, or in a decentralized distributed ledger, such as in a decentralized identifier (DID) document. Thus, in this embodiment, the holder computing system accesses the portable identity card data structure 300 from whatever holder computing system is in the control of the holder, by using the DID of the holder.

Thus, the portable identity card data structure 300, along with the associated verifiable credential 310 and the usage data 320 for that verifiable credential, are available on different computing systems or devices of the holder. Accordingly, the holder may present the portable identity card from a variety of different devices, and also keep track of usage of the verifiable credential despite the verifiable credential being presented from various systems or devices in control of the holder. The holder may also present verifiable credentials from outside of any given sphere of trust (e.g., outside of a corporate network), since the portable identity card can be securely accessed by any of the holder's devices.

An example use scenario for a portable identity card will now be described with respect to the user interfaces of FIGS. 4A through 7C. In this particular use scenario, an issuer is a fictional baseball league called the Contoso Baseball League (or simply "Contoso"), who is to issue a verifiable credential to players in that baseball league. Also, the holder is a player (called John Doe in the example) of the Contoso Baseball League. The verifiers are various partners (called Partner A, Partner B, and so forth) that provide benefits to players of the Contoso Baseball League.

In FIGS. 4A through 4F, the issuer creates a portable identity card template, which is used to create a portable identity card for each player who authenticates to the issuer and requests their respective portable identity card.

Figure 4A:
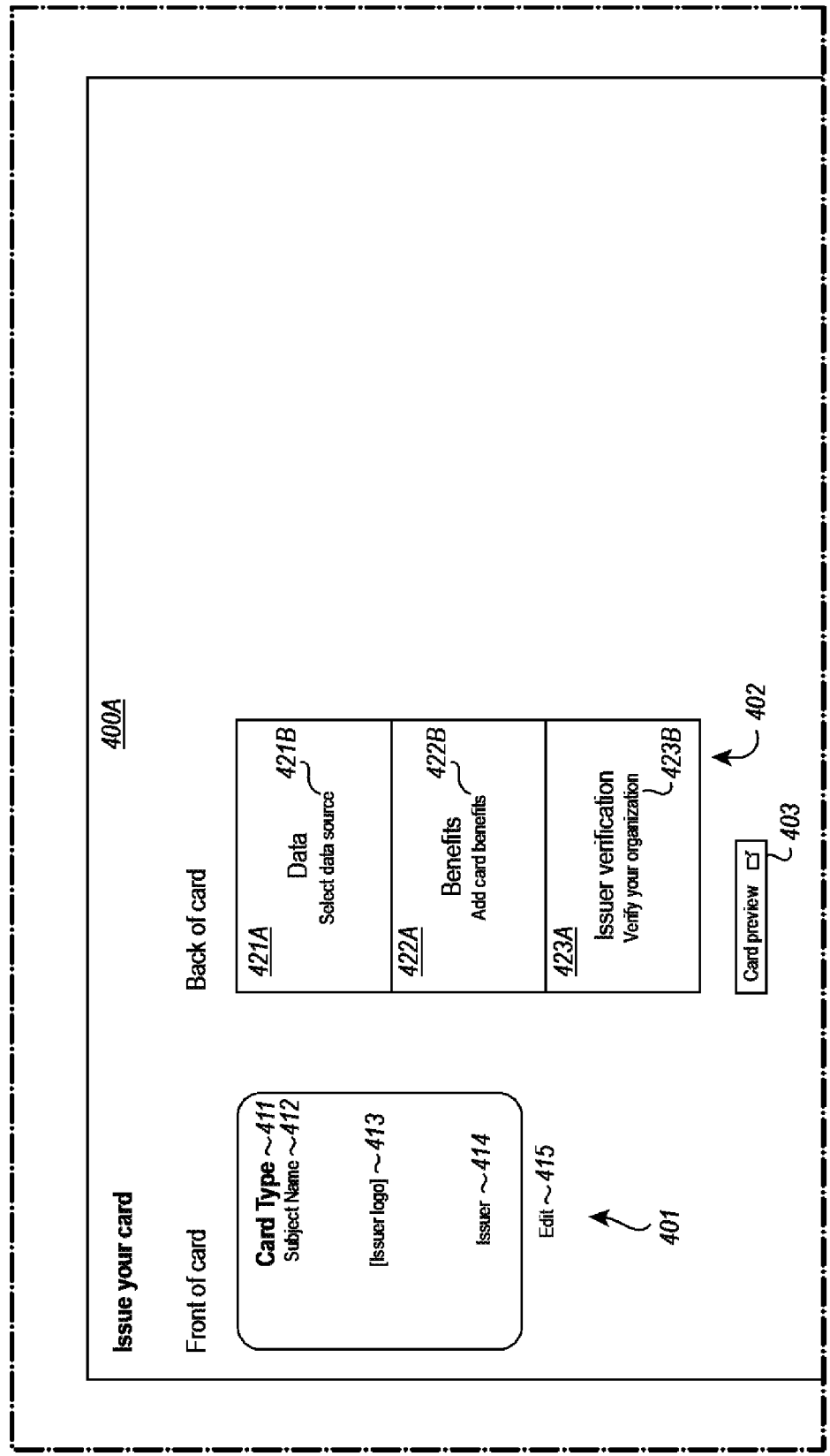

In FIG. 4A, the issuer computing system presents the issuer with a user interface 400A that allows the issuer to begin the process of creating a portable identity card template. The initial user interface 400A displays a card front region 401 that the issuer will interface with to populate the front of the portable identity card template, a card back region 402 that the issuer will interface with to populate the back of the portable identity card template, and a card preview control 403 that the issuer interfaces with to see a preview of the portable identity card template to date.

The card front region 401 includes a card type area 411 that will display the type of portable identity card template. The card front region 401 also includes a subject name area 412 that will display the subject about which the issuer will make claims on the portable identity card. In this example, the subject name will be the player's name, and will remain unpopulated in the portable identity card template. The subject name will only become populated in the respective portable identity card when the player authenticates to the issuer, and requests their respective portable identity card. The card front region 401 also includes an issuer logo area 413 that will display a logo of the issuer, and an issuer identity region 414 that will display an identity of the issuer. The front of card region 401 also includes an edit control 415 that the issuer will select to begin populating the areas 411, 413 and 414 of the front of the portable identity card template.

The card back region 402 includes a data source region 421A that will represent the source of data from which data will be drawn to create the portable identity card from the portable identity card template. The issuer initiates selection of the data source by first activating the select data source control 421B. The card back region 402 also includes a benefits region 422A that will show any card benefits the holder will have. The issuer initiates identification of these benefits by first activating the add card benefits control 422B. The card back region 402 also includes an issuer verification region 423A that the issuer interfaces with in order to authenticate the identity of the issuer by first activating the verify your organization control 423B.

Figure 4B:
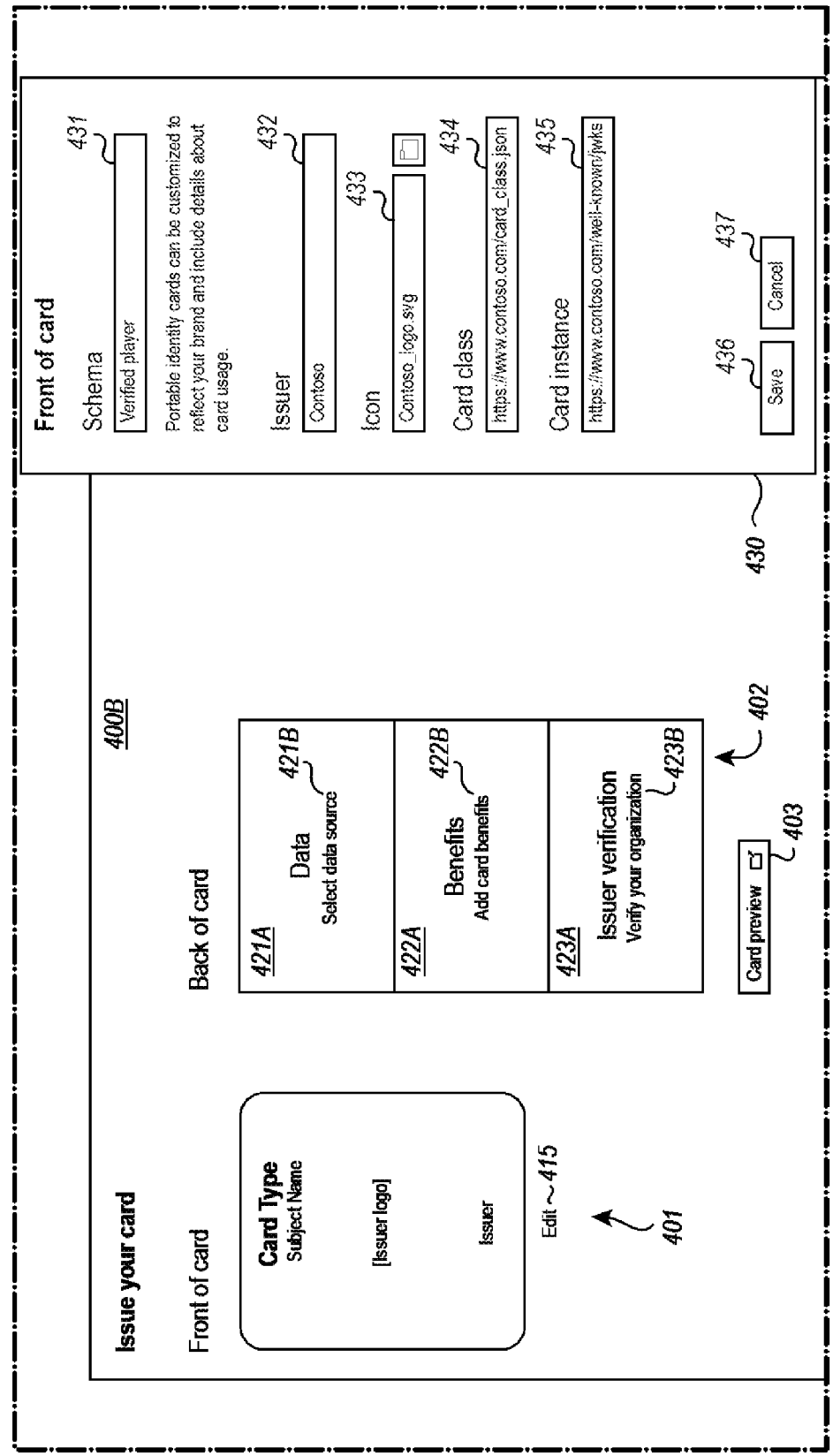

FIG. 4B shows a user interface 400B that appears after the issuer selects the edit control 415 to thereby show a card front detail window 430. To emphasize that the issuer is entering information from the front of the card, the front of card region 401 is highlighted. In this card front detail window 430, the issuer enters a schema (or type) of the portable identity card (in this case Verified player) in the schema input field 431, a name of the issuer in the issuer name field 432, a file name identifying a logo file for the issuer in the icon field 433, a card class in the card class field 434, and a card instance in the card instance field 435. The issuer saves this information and closes the card front detail window 430 by selecting the save control 436. Alternatively, the issuer discards the entered information and closes the card front detail window 430 by selecting the cancel control 437.

Figure 4C:
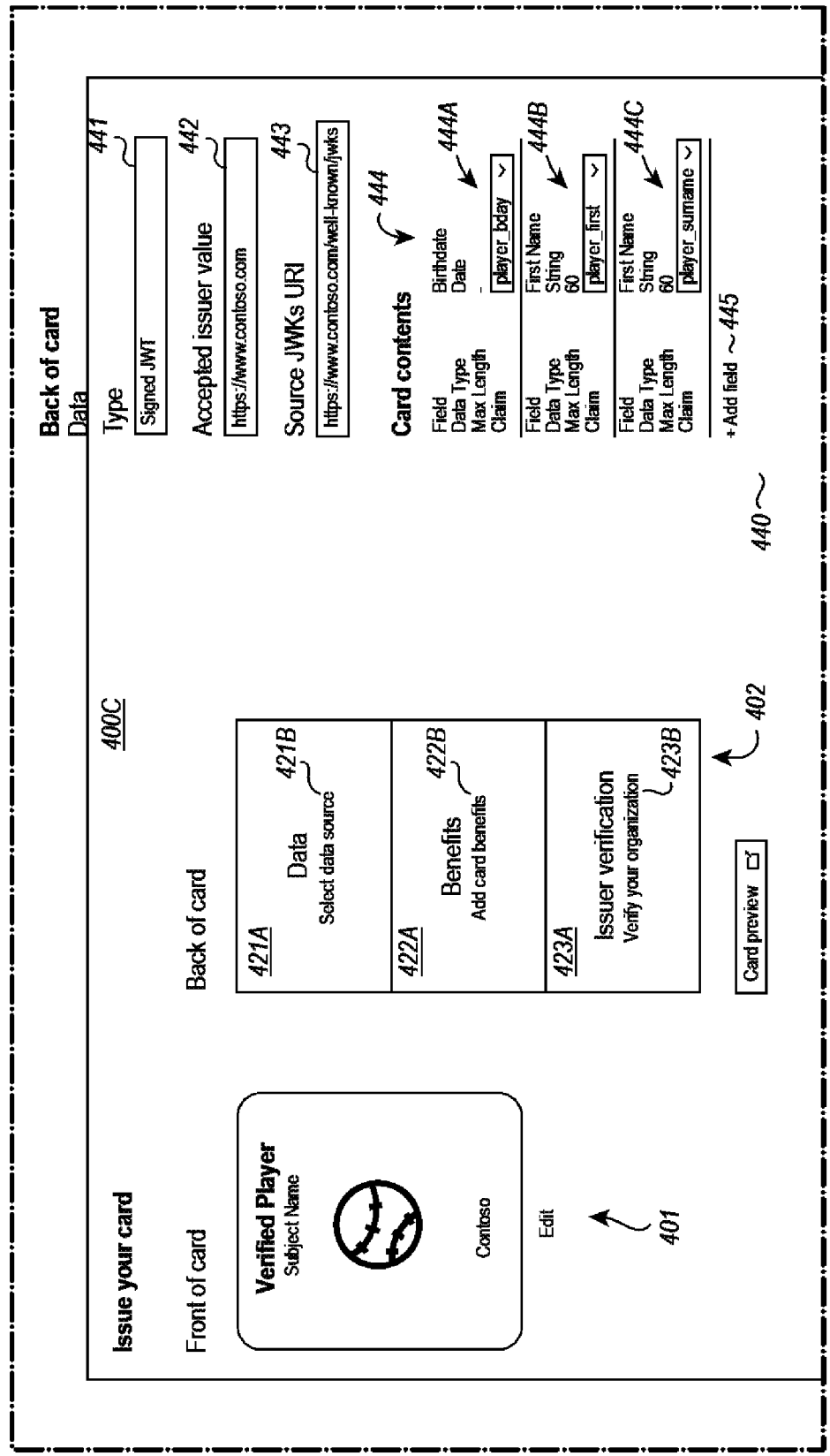

FIG. 4C illustrates a user interface 400C that appears when the issuer selects the save control 436 of FIG. 4B, and thereafter activates the select data source control 421B. The selection of the save control 436 causes the card front region 401 to now be populated with the card type "Verified Player", the issuer logo (here, a logo of the fictional baseball league Contoso), and the issuer name of "Contoso". At this stage, the subject name remains unpopulated because this portable identity card template is to be used to create multiple portable identity cards for multiple subjects (baseball players in this example). The selection of the select data source control 421B opens a card back data window 440. To emphasize that the issuer is now working on identifying the data source to be used to populate portable identity cards, the data source region 421A is highlighted.

In the card back data window 440, the issuer has entered the type of data source (here, JWT or JSON Web Token) in drop down field 441, the accepted issuer value in accepted issuer value field 442, and the source JSON Web Token uniform resource identifier in the source JWKs URI field 443. The accepted issuer value is the source that the issuer accepts as being accurate data for making claims. Later, when a player requests a portable identity card, the data source will be used to populate the claims that the issuer identifies in the card contents field 444. Thus, the verifiable credential for the player will include those claims identified in the card contents field 444.

In this example, the issuer specified in field 444A that the credential is to include a claim of type player_bday (a player birthday as selected from a drop down menu of various claim types) from the Birthdate field having data type Date of the selected data source. Additionally, the issuer specified in field 444B that the credential is to include a claim of type player first (a player first name as selected from the drop down menu) from the First Name field having data type String of maximum length 60. The issuer specified in field 444C that the credential is to include a claim of type player last (a player last name from the drop down menu) from the Last Name field also of type string having a maximum length of 60. If the credential is to include further claims, the user may select the add field control 445. Thus, the fields 444 represent which data will be extracted and what form the data will take when claims are actually generated at the time each respective portable identity card is created from the portable identity card template.

Figure 4D:
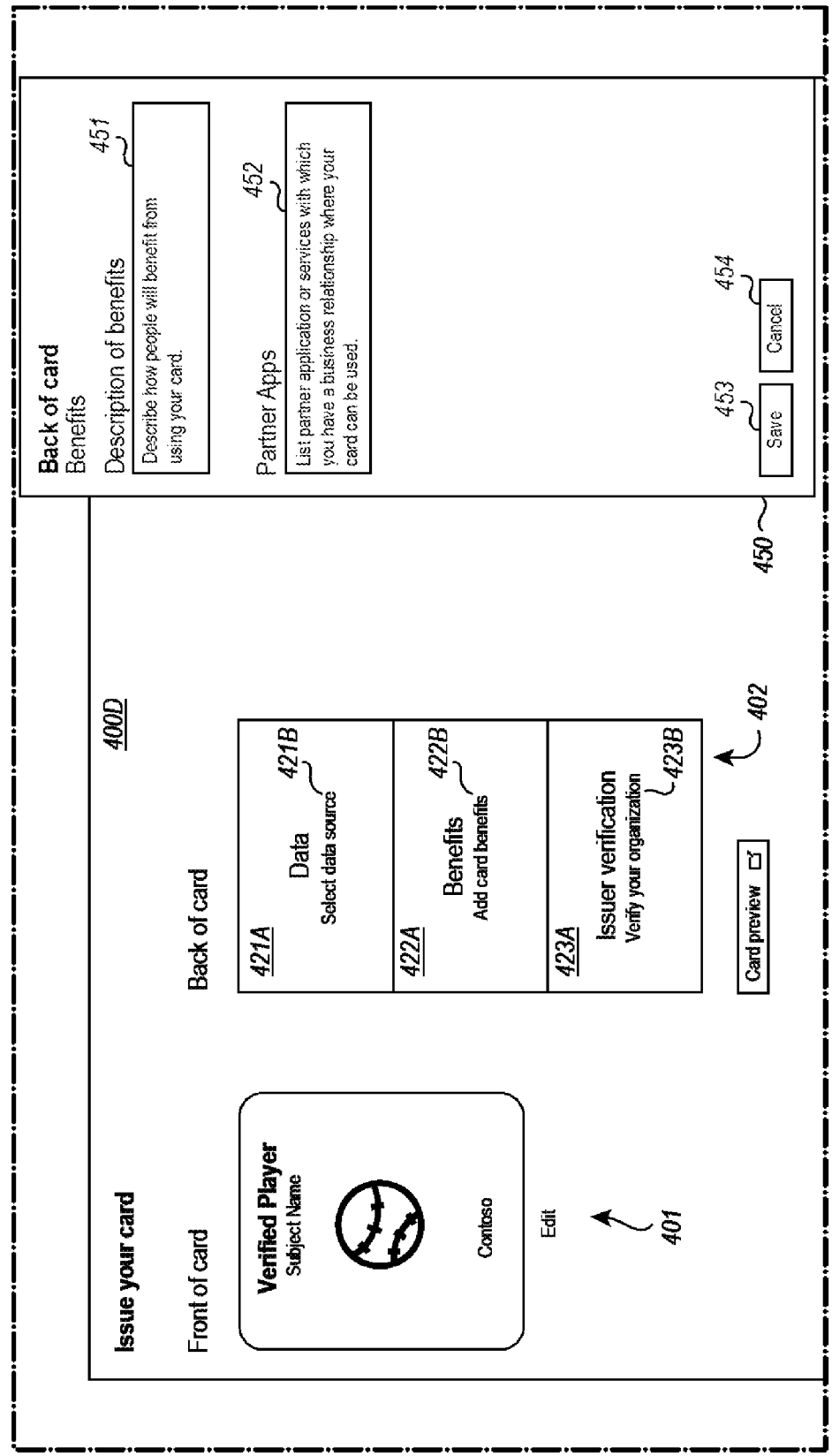

The user interface 400D of FIG. 4D is shown when the has selected the add card benefits control 422B in the benefits region 422A of the card back region 402. This causes the information from the card back data window 440 to be saved as the data source and claims that are to be used to generate subsequent portable identity cards from the portable identity card template. The completion of entry of the data source is now represented by a check mark in the data source region 421A, and the other highlighting is now removed from the data source region 421A.

The selection of the add card benefits control 422B also causes the benefits region 422A to be highlighted, and the card back benefits window 450 to appear. Here, the issuer identifies a human-readable description of the benefits in the field 451, and also identifies partner apps (for partners or services where the portable identity cards can be used by the respective holders) in the partner apps field 452. The issuer may then select the save control 453 to save these benefits to the portable identity card template or the cancel control 454 to cancel entry of these benefits without saving them to the portable identity card template. Suppose in our example that the issuer has saved the benefits using the save control 453.

Figure 4E:
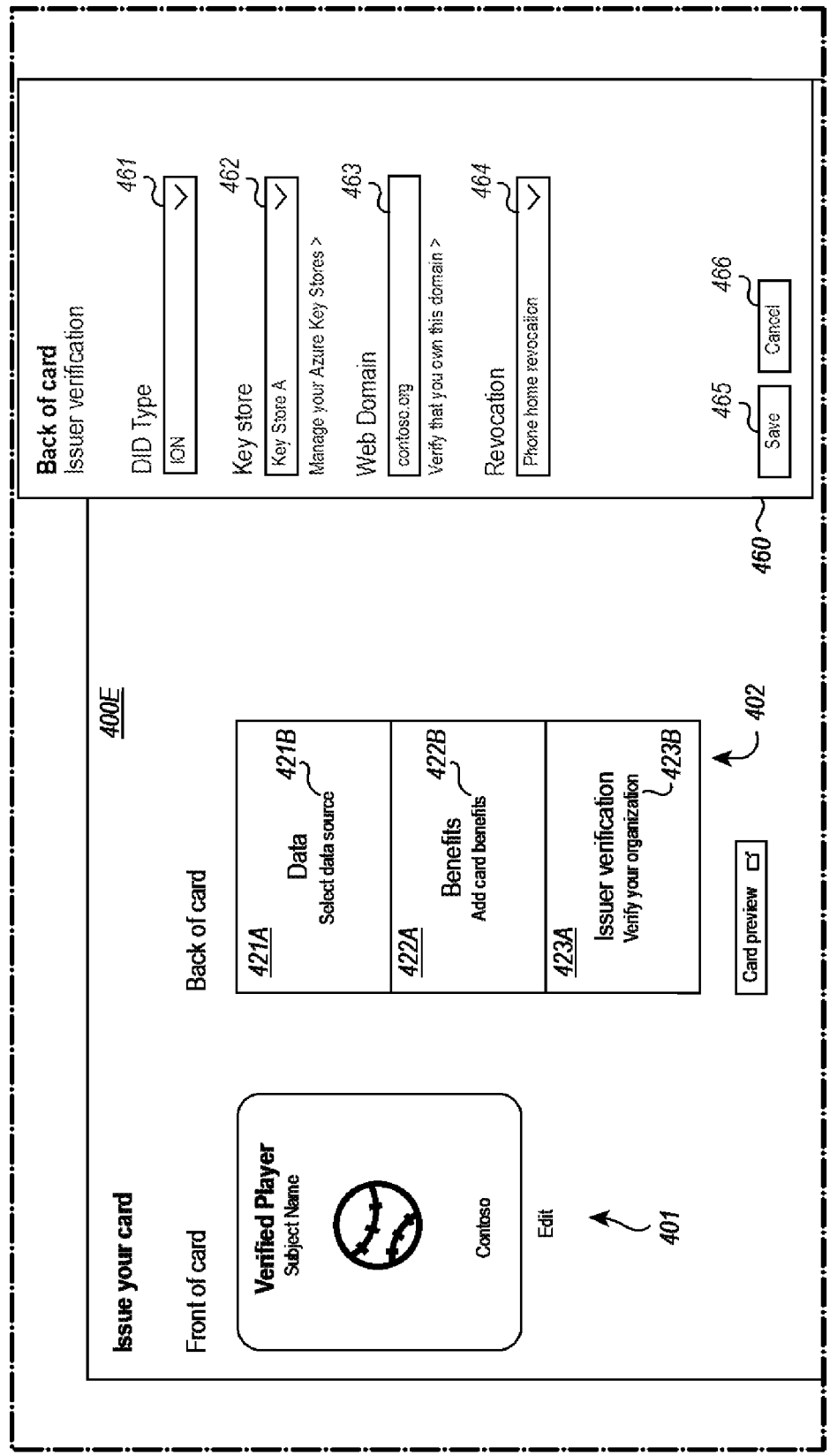

In the user interface 400E of FIG. 4E, the issuer has now selected the verify your organization control 423B in the issuer verification region 423A of the card back region 402. This causes the issuer verification region 423A to be highlighted, and causes the card back issuer verification window 460 to appear. The completion of the entry of benefits information in the benefits region 422A is also represented by the benefits region 422A containing a check mark. The issuer then entered a decentralized identity (DID) type called ION from the drop down field 461, a key store identity (herein, "Key Store A") in the key store drop down field 462, a web domain for the issuer in the web domain field 463, and a revocation method for revoking the verifiable credential in the revocation drop down field 464. The issuer then selects the save control 465 to save these issuer verification details, or the cancel control 466 to cancel entry of these benefits without saving them to the portable identity card.

Suppose in our example that the issuer has saved the verification details using the save control 465. FIG. 4F shows a resulting interface 400F that now shows all details windows being closed, and showing the issuer verification field with a check mark. The issuer computing system responds by creating a portable identity card template data structure, which is now ready to be used to create portable identity cards for individual holders (e.g., players) after they authenticate to the issuer.

Figure 5A:
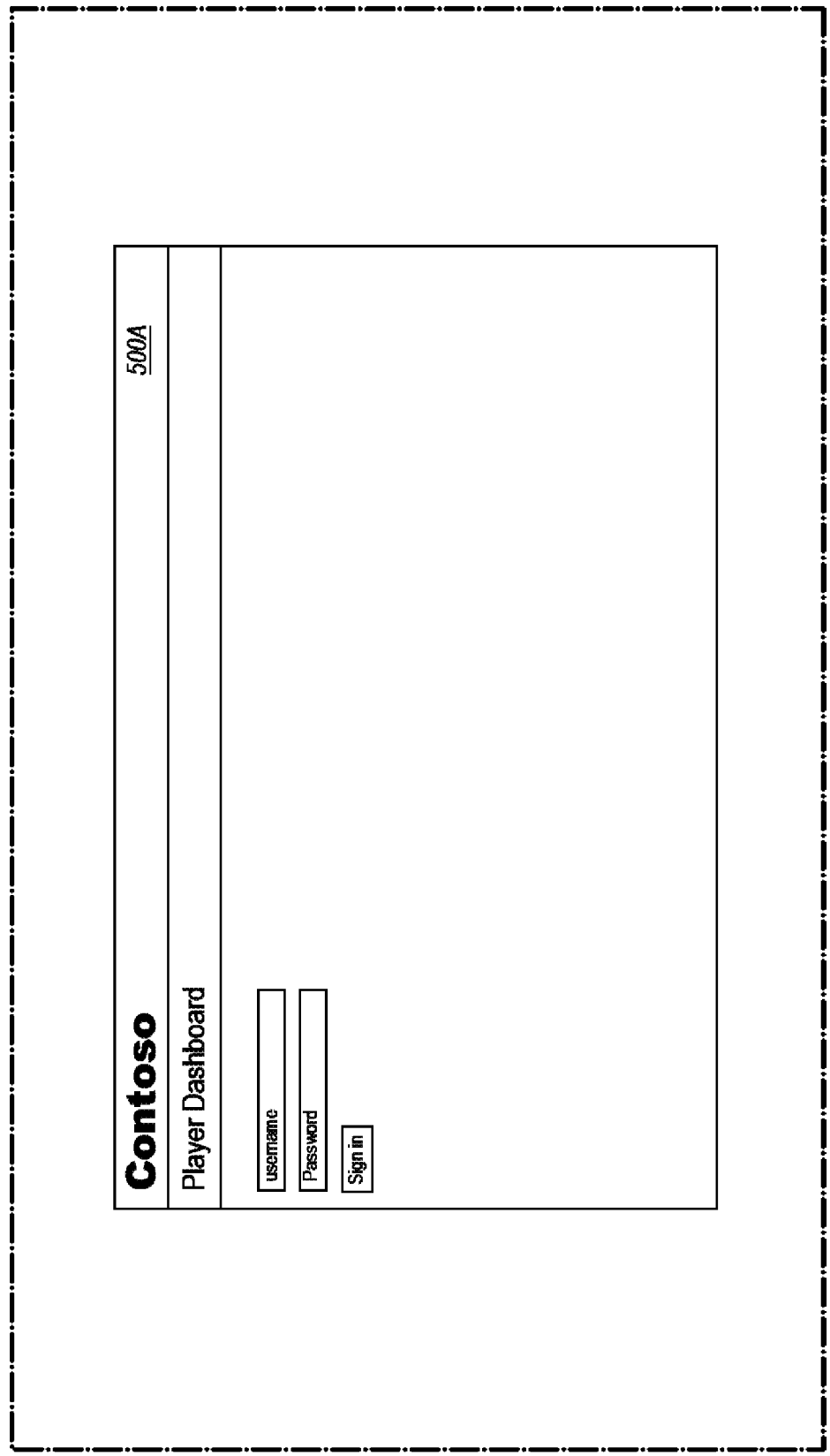

An example holder user experience will now be described with respect to the user interfaces of FIGS. 5A through 5F. FIG. 5A illustrates a user interface 500A in which the holder (in this case a Contoso Baseball League player) signs into a player dashboard offered by the issuer (in this case the Contoso Baseball League).

FIG. 5B illustrates an interface 500B displayed to the player after authentication is completed. Here, basic information about the player (name, player ID, team, status, position) is displayed, along with a QR code that allows the player to download a further authenticator. In this fictional example, the name of the Contoso Baseball League player that signed into the issuer portal is "John Doe".

In the user interface 500C of FIG. 5C, the player (John Doe) is given an option to scan a QR code in order to add or share (i.e., present) a credential. Recall that there is a portable identity card template that has been created in FIGS. 4A through 4F precisely for creating portable identity cards for Contoso baseball players such as John Doe. Accordingly, when the player scans the QR code of FIG. 5C, the portable identity card template is used to create a portable identity card data structure using John Doe's information. This includes creating the verifiable credential with the designated claims about John Doe. In addition, as represented by the user interface 500D of FIG. 5D, John Doe is presented with a visualization of the front of the portable identity card now populated with John Doe's name.

Figure 5D:
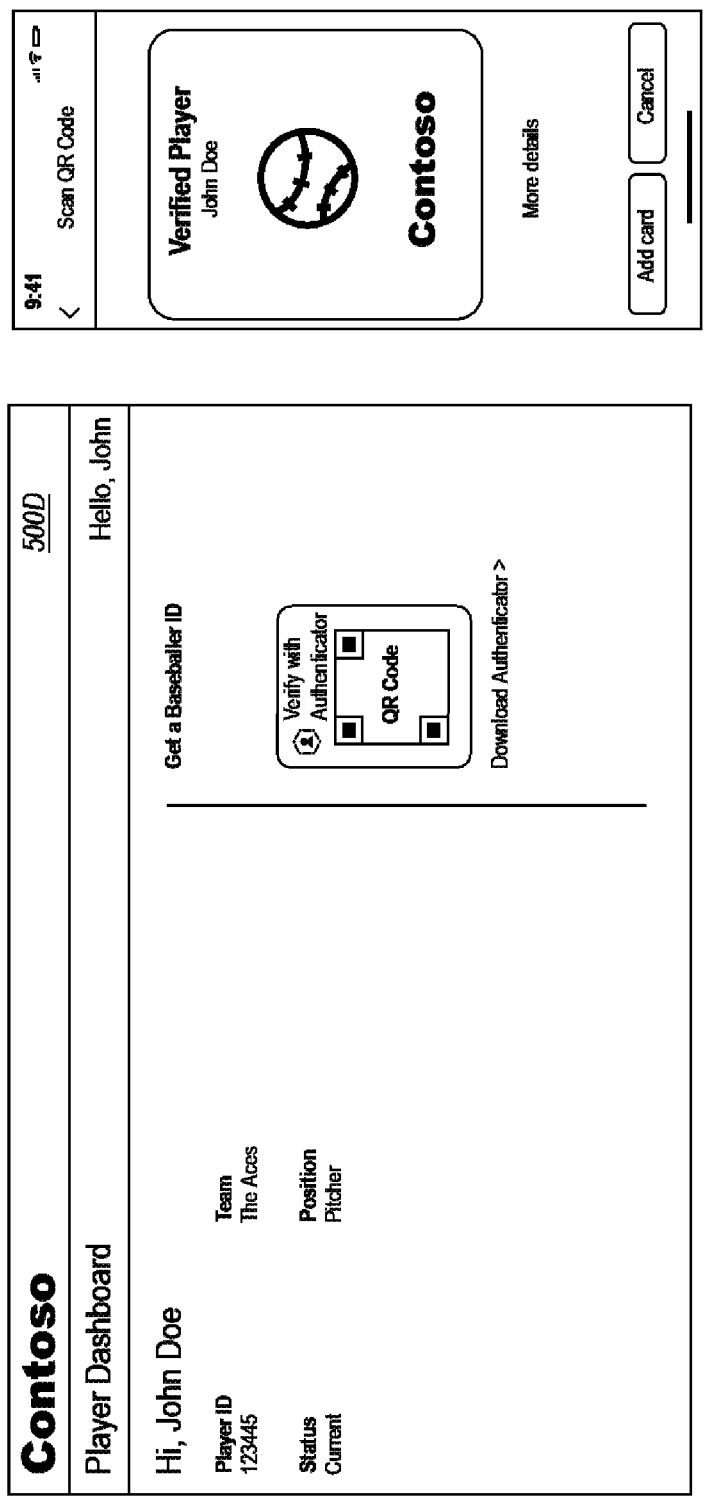
Figure 5E:
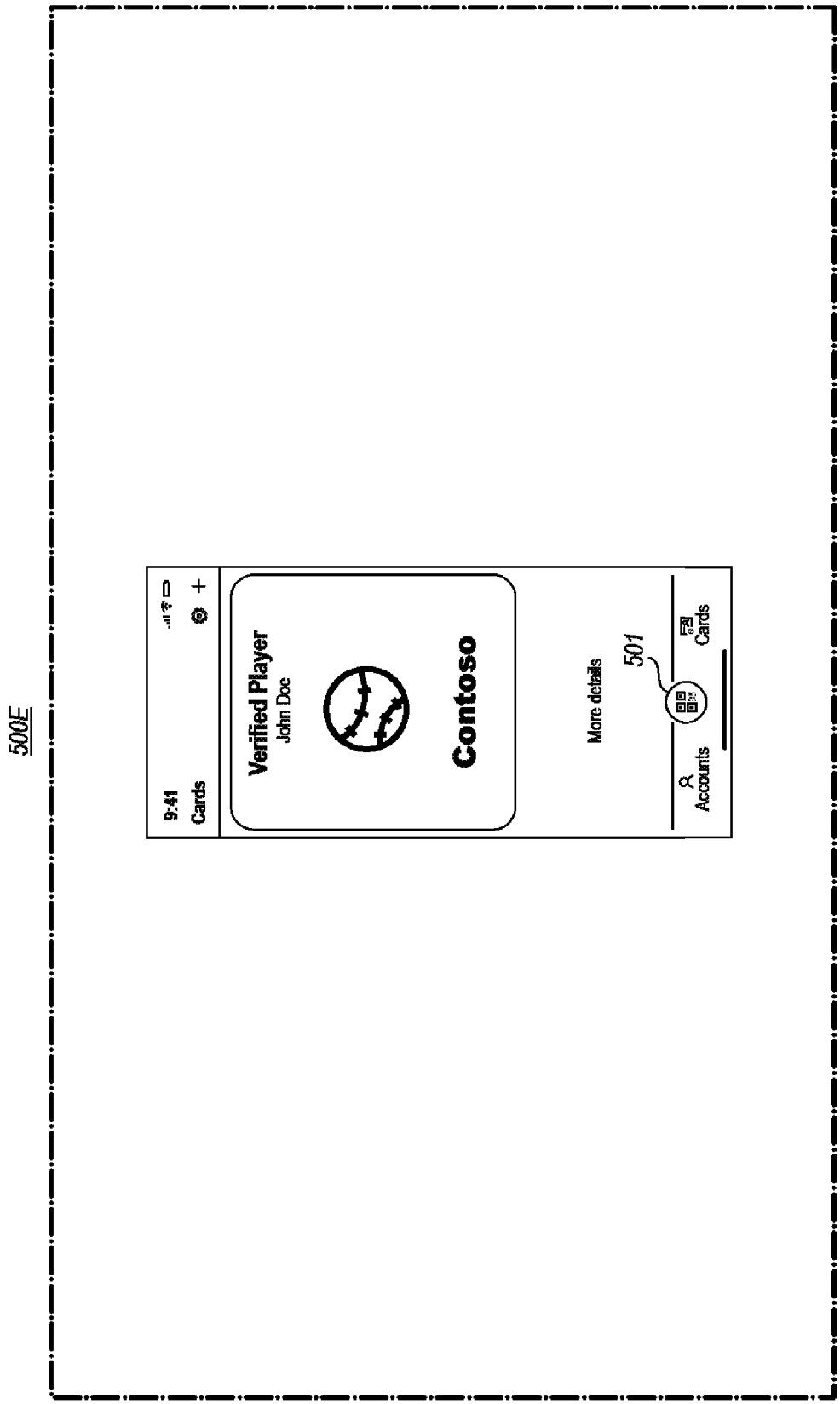

Suppose that John Doe selects that "Add card" control in the user interface 500D of FIG. 5D. The verified player portable identity card is then added to John Doe's available portable identity cards. Furthermore, player John Doe can now interface with the portable identity card as illustrated in the user interface 500E of FIG. 5E. As an example, the user selects control 501 to see details of the card, as illustrated in the user interface 500F of FIG. 5F. The player can see their name, baseball player ID, their status, the partners that the player can present their portable identity card to, and issuer identification. The player may now present the portable identity card to any of the identified partners.

Figure 6A:
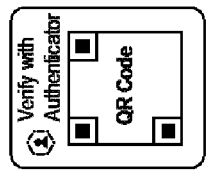
Figure 6B:
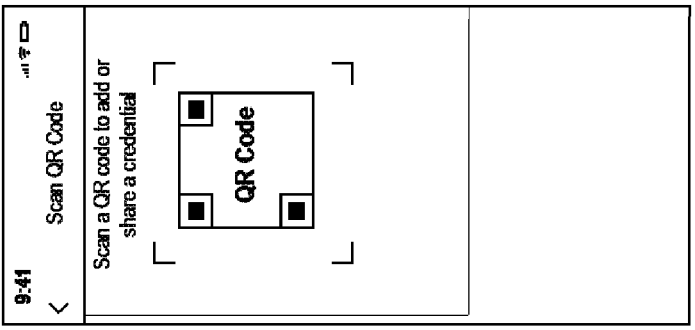

In the example of FIGS. 6A through 6C, the player presents the portable identity card to a verifier (or relying party), which is one of the partners listed in the portable identity card. The user interface 600A of FIG. 6A is presented to John Doe when John Doe selected Partner A from his portable identity card displayed in the user interface 500E of FIG. 5E. Player John Doe scans the QR code, resulting in user interface 600B of FIG. 6B. John Doe may then cause the QR code to be presented to a computing system of Partner A. John Doe is then presented with the user interface 600C or FIG. 6C, in which the user selects the "Allow" control to present the verifiable credential (or an associated verifiable presentation) associated with the portable identity card with Partner A. When the verifiable credential is presented to Partner A, the computing system of Partner A follows the proof instruction (which may include contacting the issuer computing system, or the registry computing system) to verify the verifiable credential.

This process may repeat for John Doe many times for many different issuers. As an example, Partner A may be a relying party, but may also itself be an issuer. Accordingly, in addition to presenting verifiable claims to Partner A, Partner A may provide John Doe with another portable identity card.

Figure 7A:
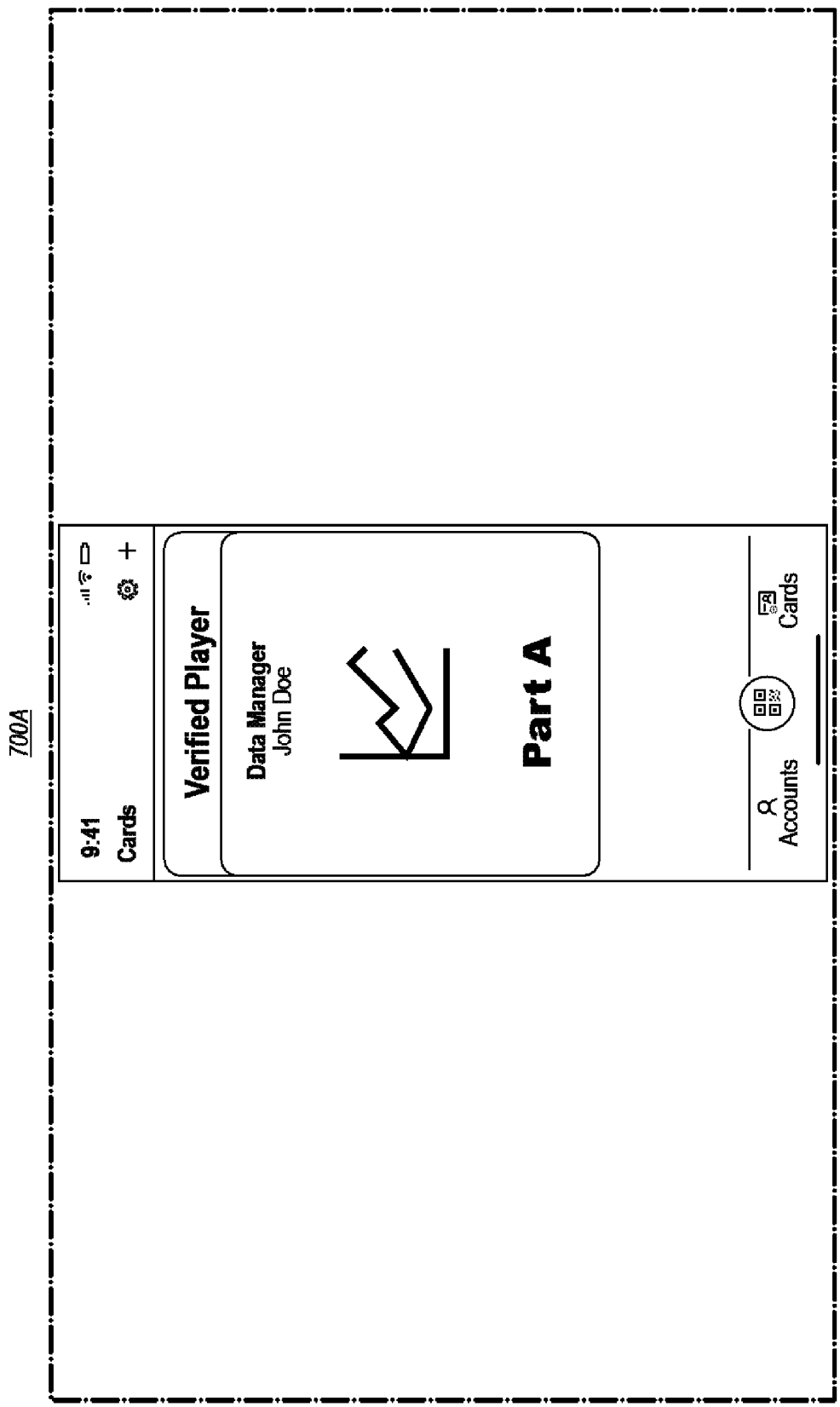
Figure 7C:
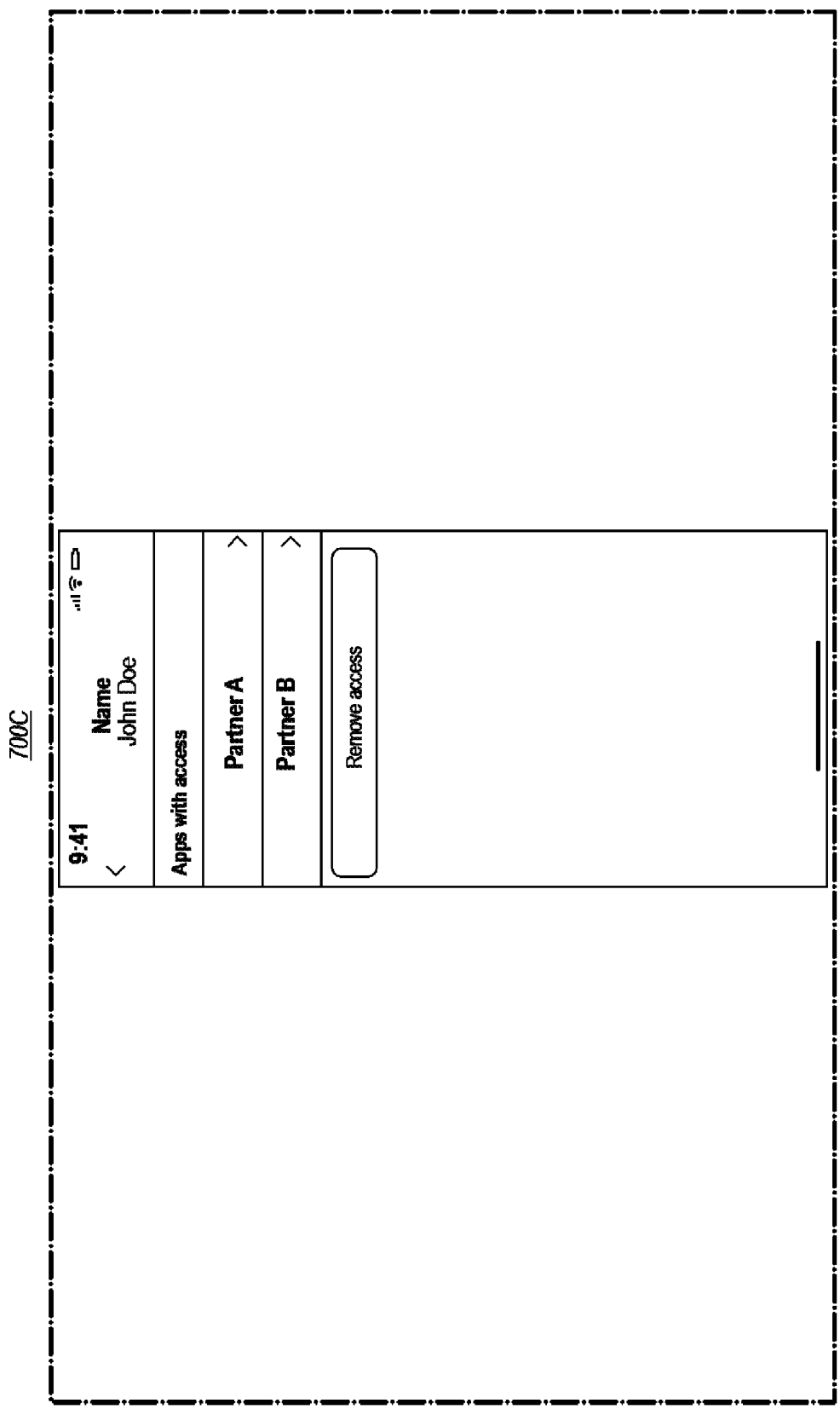

FIG. 7A illustrates a user interface 700A that shows John Doe a stack of now two portable identity cards—the Verified player portable identity card provided by the Contoso Baseball League, as well as a Data Manager portable identity card provided by Partner A. Suppose that the user interfaces with the Player portable identity card to view transaction history associated with the verifiable credential of that portable identity card. The user interface 700B of FIG. 7B is then displayed to John Doe showing several transactions of that card with the Data Manager application of Partner A. FIG. 7C illustrates a user interface 700C that allows John Doe to view which Partners have been granted access to the Verified player portable identity card, and to potentially revoke access.

FIG. 8 illustrates a flowchart of a method 800 for presenting a verifiable credential, in accordance with the principles described herein. The method 800 includes representing a verifiable credential within a data structure (act 801). As an example, in FIG. 3, the verifiable credential 310 is represented within the portable identity card data structure 300. Thus, the verifiable credential 310 is an example of the verifiable credential of act 801, and the portable identity card data structure 300 is an example of the data structure of act 801. Recall that the verifiable credential 310 includes multiple verifiable claims. As an example, if the verifiable credential 310 is structured as described for the verifiable credential 100 of FIG. 1, the verifiable credential 310 includes multiple verifiable claims.

The method 800 also includes monitoring usage of the verifiable credential (act 802). Such monitoring may include when and where the verifiable credential was presented, which relying parties the verifiable credential was presented to, when the verifiable credential was last presented to a relying party, and so forth. In the example of FIG. 7B, the user interface 700B shows the user the transaction date, the portable identity card identifier that uniquely identifier the portable identity card, the issuer of the portable identity card, the third party application to which the portable identity card was presented as part of the respective transaction, and what the result was of the corresponding verification with the issuer (e.g., valid, or no response).

The method 800 also includes storage usage data also with the data structure (act 803). As an example, referring to FIG. 3, the usage data 320 is also stored within the portable identity card data structure 300. In FIG. 8, the arrows 811 and 812 represent that as monitoring continues (act 802), the usage data is updated (act 803), such that the usage data is fresh. That is, as usage of the verifiable credential changes or progresses, the stored usage data also changes. Accordingly, the acts 802 and 803 within the dashed-lined box 810 represent a continuous process.

FIG. 9 illustrates a flowchart of a method 900 for using the portable identity card data structure, in accordance with the principles described herein. In one example, the methods 800 and 900 are each is performed by a holder computing system, such as the holder computing system 220 of FIG. 2. For instance, if the holder computing system 220 is structured as described below for the computing system 1200 of FIG. 12, the methods 800 and 900 can be performed by the computing system 1200 in response to the at least one hardware processing unit 1102 executing computer-executable instructions that are structured such that, when executed by the at least one hardware processing unit 1202, the computing system 1200 is caused to perform the method 800 or 900.

Figure 5F:

This method 90 includes causing (act 901) a visual representation of the verifiable credential to be displayed to a user. The visual representation represents a property name and value for each of at least a subset of the verifiable claims of the verifiable credential. As an example, in FIG. 5F, the user interface 500F shows a number of property-value pairs that represent claims (in human-readable form) of the corresponding verifiable credential. In FIG. 5F, the verifiable claims include for one claim a property of name and a value of "John Doe", for a second claim a property of baseballer ID and a value of 123456, for a third claim a property of status and a value of active, and so forth. Thus, the holder may see the claims that each verifiable credential contains.

However, the visual representation also may include a machine-readable representation of property-value pairs of claims and/or proof instructions for the verifiable credential. Examples of such a machine-readable representation includes a bar code or QR code. Such a machine-readable representation may also represent the proof instructions of the verifiable credential. Accordingly, by scanning a bar code or QR code, the verifiable credential is automatically verified by the verifier computing system.

The method 900 also includes at least selectively causing at least some of the usage data to be presented to the user (act 902). Thus, a user may visually see how the verifiable credential has been used. As an example, the user can see when and where a credential was used, which relying party relied upon the credential, what device was used to present the verifiable credential, and so forth.

Thus, the principles described herein provide portable identity card data structures that include both a verifiable credential as well as usage data. As previously mentioned, the principles described herein may be performed in a decentralized context. As an example, the holder computing system can be a digital wallet, such as the DID management module 1120 described below with respect to FIG. 11. Alternatively, or in addition, the subject of the claims, and the issuer identifier, can be decentralized identifiers (DIDs). Alternatively, or in addition, the portable identity card data structure (or portions thereof) may be stored in a DID document. This would be especially helpful as the portable identity card would then be accessible by the holder from any device associated with the holder's DID. Accordingly, decentralized identifiers will first be described with respect to FIGS. 10 and 11.

Figure 10:
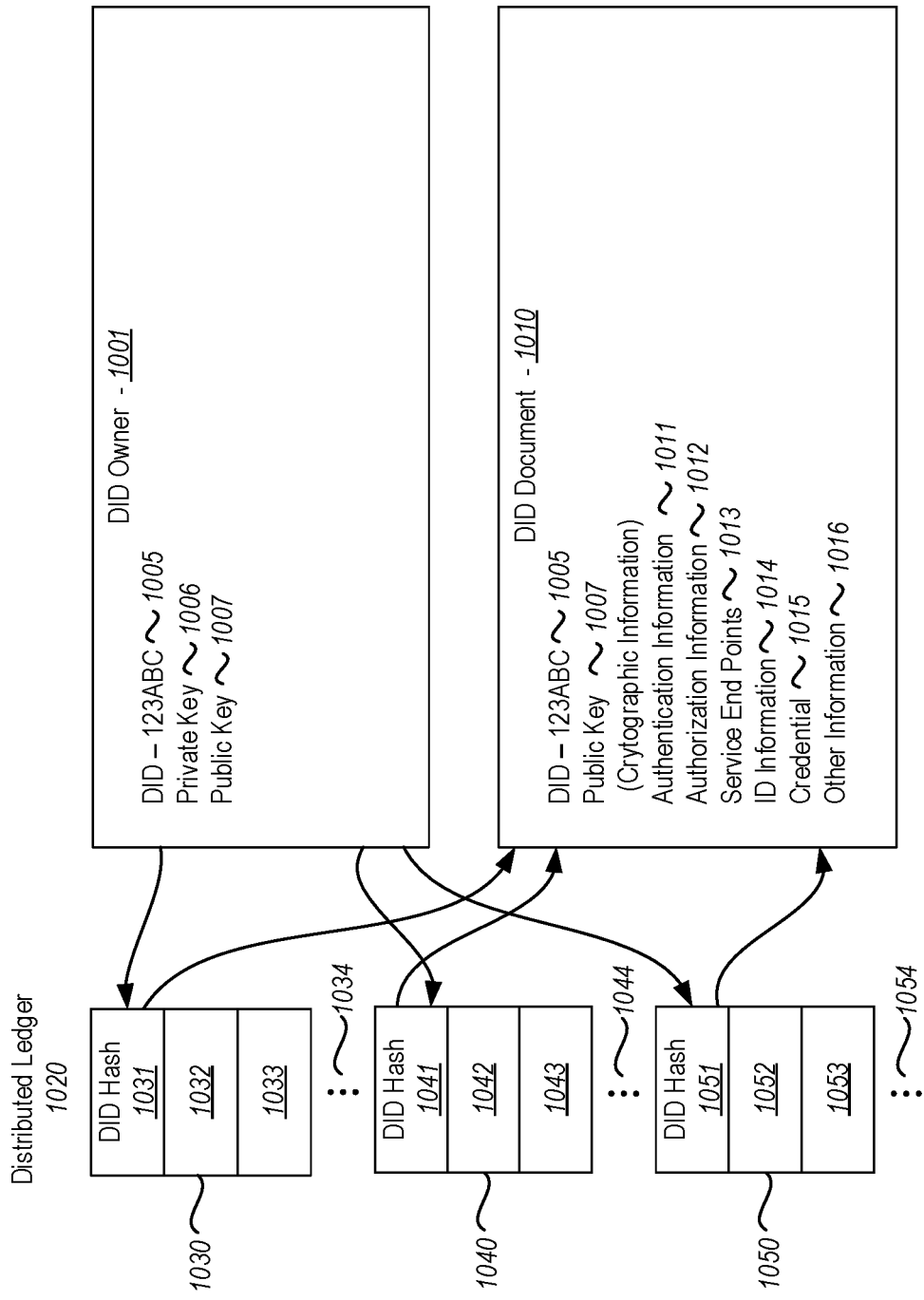
FIG. 10 illustrates an example environment for creating a decentralized identification (DID)

As illustrated in FIG. 10, a DID owner 1001 may own or control a DID 1005 that represents a digital identity of the DID owner 1001. The DID 1005 is a digital identity that correlates with (i.e., identifies) the DID owner 1001 across different digital contexts. The DID owner 1001 may register a DID using a creation and registration service, which will be explained in more detail below.

The DID owner 1001 may be any entity that could benefit from a digital identity. For example, the DID owner 1001 may be a human being or an organization of human beings. Such organizations might include a company, department, government, agency, or any other organization or group of organizations. Each individual human being might have a DID while the organization(s) to which each belongs might likewise have a DID.

The DID owner 1001 may alternatively be a machine, system, or device, or a collection of machine(s), device(s) and/or system(s). In still other embodiments, the DID owner 1001 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 1206 described above with respect to FIG. 12. An example of a complex executable component 1206 might be an artificial intelligence. Accordingly, an artificial intelligence may also own a DID.

Thus, the DID owner 1001 may be any entity, human or non-human, that is capable of creating the DID 1005 or at least having the DID 1005 created for and/or associated with them. Although the DID owner 1001 is shown as having a single DID 1005, this need not be the case as there may be any number of DIDs associated with the DID owner 1001 as circumstances warrant.

As mentioned, the DID owner 1001 may create and register the DID 1005. The DID 1005 may be any identifier that may be associated with the DID owner 1001. Preferably, that identifier is unique to that DID owner 1001, at least within a scope in which the DID is anticipated to be in use. As an example, the identifier may be a locally unique identifier, and perhaps more desirably a globally unique identifier for identity systems anticipated to operate globally. In some embodiments, the DID 1005 may be a Uniform Resource identifier (URI) (such as a Uniform Resource Locator (URL)) or other pointer that relates the DID owner 1001 to mechanisms to engage in trustable interactions with the DID owner 1001.

The DID 1005 is "decentralized" because it does not require a centralized, third party management system for generation, management, or use. Accordingly, the DID 1005 remains under the control of the DID owner 1001. This is different from conventional centralized IDs which base trust on centralized authorities and that remain under control of corporate directory services, certificate authorities, domain name registries, or other centralized authority (referred to collectively as "centralized authorities" herein). Accordingly, the DID 1005 may be any identifier that is under the control of the DID owner 1001 and that is independent of any centralized authority.

In some embodiments, the structure of the DID 1005 may be as simple as a user name or some other human-understandable term. However, in other embodiments, for increased security, the DID 1005 may preferably be a random string of numbers and letters. In one embodiment, the DID 1005 may be a string of 128 numbers and letters. Accordingly, the embodiments disclosed herein are not dependent on any specific implementation of the DID 1005. In a very simple example, the DID 1005 is shown within the figures as "123ABC".

As also shown in FIG. 10, the DID owner 1001 has control of a private key 1006 and public key 1007 pair that is associated with the DID 1005. Because the DID 1005 is independent of any centralized authority, the private key 1006 should at all times be fully in control of the DID owner 1001. That is, the private and public keys should be generated in a decentralized manner that ensures that they remain under the control of the DID owner 1001.

As will be described in more detail to follow, the private key 1006 and public key 1007 pair may be generated on a device controlled by the DID owner 1001. The private key 1006 and public key 1007 pair should not be generated on a server controlled by any centralized authority as this may cause the private key 1006 and public key 1007 pair to not be fully under the control of the DID owner 1001 at all times. Although FIG. 10 and this description have described a private and public key pair, it will also be noted that other types of reasonable cryptographic information and/or mechanisms may also be used as circumstances warrant.

FIG. 10 also illustrates a DID document 1010 that is associated with the DID 1005. As will be explained in more detail to follow, the DID document 1010 may be generated at the time that the DID 1005 is created. In its simplest form, the DID document 1010 describes how to use the DID 1005. Accordingly, the DID document 1010 includes a reference to the DID 1005, which is the DID that is described by the DID document 1010. In some embodiments, the DID document 1010 may be implemented according to methods specified by a distributed ledger 1020 (such as blockchain) that will be used to store a representation of the DID 1005 as will be explained in more detail to follow. Thus, the DID document 1010 may have different methods depending on the specific distributed ledger.

The DID document 1010 also includes the public key 1007 created by the DID owner 1001 or some other equivalent cryptographic information. The public key 1007 may be used by third party entities that are given permission by the DID owner 1001 to access information and data owned by the DID owner 1001. The public key 1007 may also be used to verify that the DID owner 1001 in fact owns or controls the DID 1005.

The DID document 1010 may also include authentication information 1011. The authentication information 1011 specifies one or more mechanisms by which the DID owner 1001 is able to prove that the DID owner 1001 owns the DID 1005. In other words, the mechanisms of the authentication information 1011 shows proof of a binding between the DID 1005 (and thus its DID owner 1001) and the DID document 1010. In one embodiment, the authentication information 1011 specifies that the public key 1007 be used in a signature operation to prove the ownership of the DID 1005. Alternatively, or in addition, the authentication information 1011 specifies that the public key 1007 be used in a biometric operation to prove ownership of the DID 1005. Accordingly, the authentication information 1011 includes any number of mechanisms by which the DID owner 1001 is able to prove that the DID owner 1001 owns the DID 1005.

The DID document 1010 may also include authorization information 1012. The authorization information 1012 allows the DID owner 1001 to authorize third party entities the rights to modify the DID document 1010 or some part of the document without giving the third party the right to prove ownership of the DID 1005. In one example, the authorization information 1012 allows the third party to update any designated set of one or more fields in the DID document 1010 using any designated update mechanism. Alternatively, the authorization information allows the third party to limit the usages of DID 1005 by the DID owner 1001 for a specified time period. This may be useful when the DID owner 1001 is a minor child and the third party is a parent or guardian of the child. The authorization information 1012 may allow the parent or guardian to limit use of the DID owner 1001 until such time as the child is no longer a minor.

The authorization information 1012 also specifies one or more mechanisms that the third party will need to follow to prove they are authorized to modify the DID document 1010. In some embodiments, these mechanisms may be similar to those discussed previously with respect to the authentication information 1011.

The DID document 1010 also includes one or more service endpoints 1013. A service endpoint includes a network address at which a service operates on behalf of the DID owner 1001. Examples of specific services include discovery services, social networks, file storage services such as identity servers or hubs, and verifiable claim repository services. Accordingly, the service endpoints 1013 operate as pointers for the services that operate on behalf of the DID owner 1001. These pointers may be used by the DID owner 1001 or by third party entities to access the services that operate on behalf of the DID owner 1001. Specific examples of service endpoints 1013 will be explained in more detail to follow.

The DID document 1010 further includes identification information 1014. The identification information 1014 includes personally identifiable information such as the name, address, occupation, family members, age, hobbies, interests, or the like of DID owner 1001. Accordingly, the identification information 1014 listed in the DID document 1010 represents a different persona of the DID owner 1001 for different purposes.

A persona may be pseudo anonymous. As an example, the DID owner 1001 may include a pen name in the DID document when identifying him or her as a writer posting articles on a blog. A persona may be fully anonymous. As an example, the DID owner 1001 may only want to disclose his or her job title or other background data (e.g., a school teacher, an FBI agent, an adult older than 21 years old, etc.) but not his or her name in the DID document. As yet another example, a persona may be specific to who the DID owner 1001 is as an individual. As an example, the DID owner 1001 may include information identifying him or her as a volunteer for a particular charity organization, an employee of a particular corporation, an award winner of a particular award, and so forth.

The DID document 1010 also includes credential information 1015, which may also be referred to herein as an attestation. The credential information 1015 may be any information that is associated with the DID owner 1001's background. For instance, the credential information 1015 may be (but is not limited to) a qualification, an achievement, a government ID, a government right such as a passport or a driver's license, a payment provider or bank account, a university degree or other educational history, employment status and history, or any other information about the DID owner 1001's background.

The DID document 1010 also includes various other information 1016. In some embodiments, the other information 1016 may include metadata specifying when the DID document 1010 was created and/or when it was last modified. In other embodiments, the other information 1016 may include cryptographic proofs of the integrity of the DID document 1010. In still further embodiments, the other information 1016 may include additional information that is either specified by the specific method implementing the DID document or desired by the DID owner 1001.

FIG. 10 also illustrates a distributed ledger 1020. The distributed ledger 1020 can be any decentralized, distributed network that includes various computing systems that are in communication with each other. In one example, the distributed ledger 1020 includes a first distributed computing system 1030, a second distributed computing system 1040, a third distributed computing system 1050, and any number of additional distributed computing systems as represented by the ellipses 1060. The distributed ledger 1020 operates according to any known standards or methods for distributed ledgers. Examples of conventional distributed ledgers that correspond to the distributed ledger 1020 include, but are not limited to, Bitcoin [BTC], Ethereum, and Litecoin.

In the context of DID 1005, the distributed ledger or blockchain 1020 is used to store a representation of the DID 1005 that points to the DID document 1010. In some embodiments, the DID document 1010 may be stored on the actual distributed ledger. Alternatively, in other embodiments the DID document 1010 may be stored in a data storage (not illustrated) that is associated with the distributed ledger 1020.

A representation of the DID 1005 is stored on each distributed computing system of the distributed ledger 1020. For example, in FIG. 10 this is shown as DID hash 1031, DID hash 1041, and DID hash 1051, which are ideally identical hashed copies of the same DID. The DID hash 1031, DID hash 1041, and DID hash 1051 point to the location of the DID document 1010. The distributed ledger or blockchain 1020 may also store numerous other representations of other DIDs as illustrated by references 1032, 1033, 1034, 1042, 1043, 1044, 1052, 1053, and 1054.

In one embodiment, when the DID owner 1001 creates the DID 1005 and the associated DID document 1010, the DID hash 1031, DID hash 1041, and DID hash 1051 are written to the distributed ledger 1020. The distributed ledger 1020 thus records that the DID 1005 now exists. Since the distributed ledger 1020 is decentralized, the DID 1005 is not under the control of any entity outside of the DID owner 1001. DID hash 1031, DID hash 1041, and DID hash 1051 may each include, in addition to the pointer to the DID document 1010, a record or time stamp that specifies when the DID 1005 was created. At a later date, when modifications are made to the DID document 1010, each modification (and potentially also a timestamp of the modification) is also be recorded in DID hash 1031, DID hash 1041, and DID hash 1051. DID hash 1031, DID hash 1041, and DID hash 1051 could further include a copy of the public key 1007 so that the DID 1005 is cryptographically bound to the DID document 1010.

Figure 11:
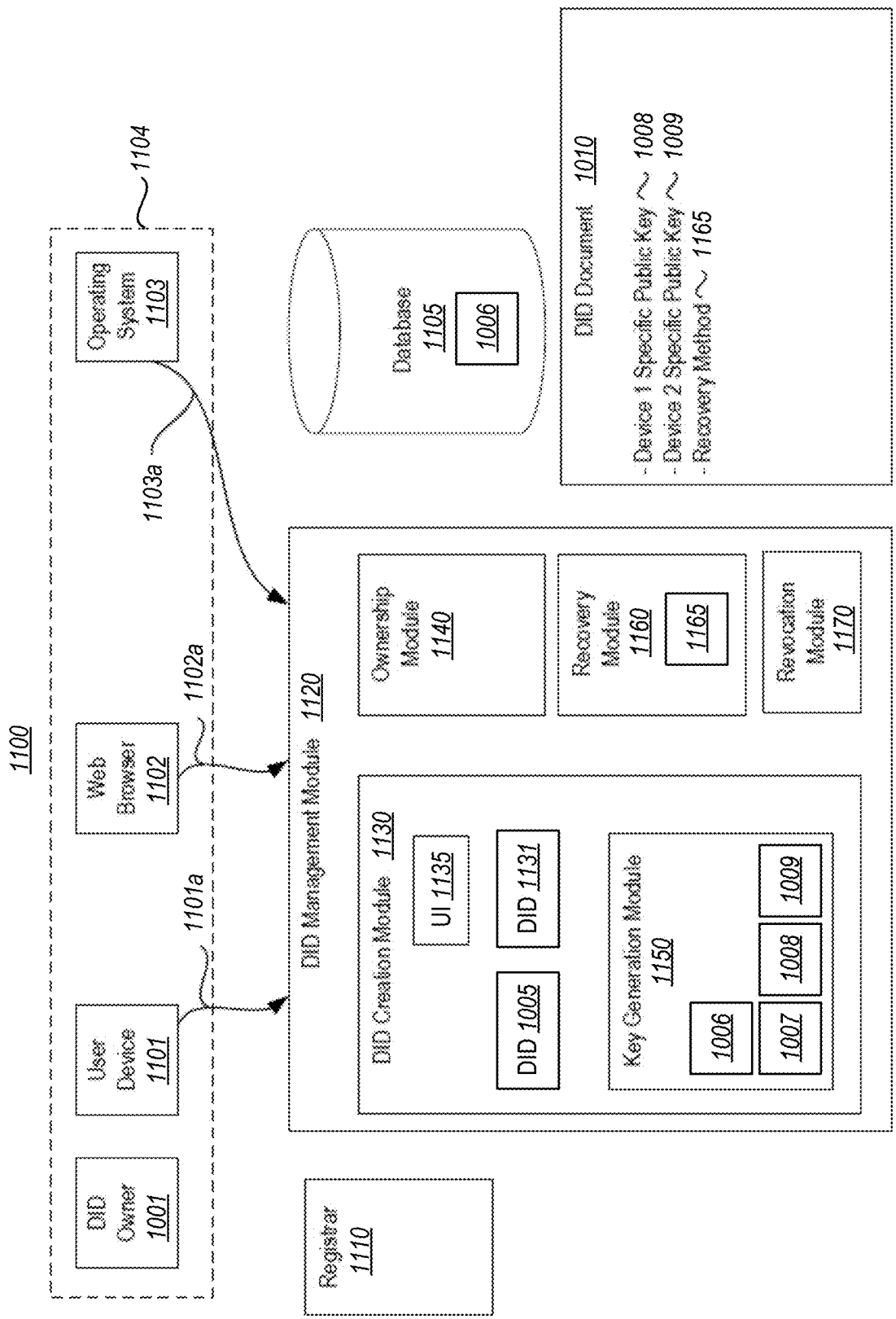
FIG. 11 illustrates an example environment for various DID management operations and services.

Having described DIDs and how they operate generally with reference to FIG. 10, specific embodiments of DID environments will now be explained with respect to FIG. 11. FIG. 11 illustrates an example environment 1100 that may be used to perform various DID management operations and services will now be explained. It will be appreciated that the environment of FIG. 11 may reference elements from FIG. 10 as needed for ease of explanation.

As shown in FIG. 11, the environment 1100 includes various devices and computing systems that are owned or otherwise under the control of the DID owner 1001. These may include a user device 1101. The user device 1101 may be, but is not limited to, a mobile device such as a smart phone, a computing device such as a laptop computer, or any device such as a car or an appliance that includes computing abilities. The device 1101 includes a web browser 1102 operating on the device and an operating system 1103 operating the device. More broadly speaking, the dashed line 1104 represents that all of these devices may be owned by or may otherwise be under the control of the DID owner 1001.

The environment 1100 also includes a DID management module 1120. In operation, as represented by respective arrows 1101a, 1102a and 1103a, the DID management module 1120 resides on and is executed by one or more of user device 1101, web browser 1102, and the operating system 1103. Accordingly, the DID management module 1120 is shown as being separate for ease of explanation. The DID management module 1120 may be also described as a "wallet" in that it can hold various claims made by or about a particular DID. In one example, the DID management module 1120 is structured as described above for the executable component 1206.

As shown in FIG. 11, the DID management module 1120 includes a DID creation module 1130. The DID creation module 1130 may be used by the DID owner 1001 to create the DID 1005 or any number of additional DIDs, such as DID 1131. In one embodiment, the DID creation module may include or otherwise have access to a User Interface (UI) element 1135 that may guide the DID owner 1001 in creating the DID 1005. The DID creation module 1130 has one or more drivers that are configured to work with specific distributed ledgers such as distributed ledger 1020 so that the DID 1005 complies with the underlying methods of that distributed ledger.

A specific embodiment will now be described. For example, the UI 1135 may provide a prompt for the user to enter a user name or some other human recognizable name. This name may be used as a display name for the DID 1005 that will be generated. As previously described, the DID 1005 may be a long string of random numbers and letters and so having a human-recognizable name for a display name may be advantageous. The DID creation module 1130 may then generate the DID 1005. In the embodiments having the UI 1135, the DID 1005 may be shown in a listing of identities and may be associated with the human-recognizable name.

The DID creation module 1130 may also include a key generation module 1150. The key generation module may generate the private key 1006 and public key 1007 pair previously described. The DID creation module 1130 may then use the DID 1005 and the private and public key pair to generate the DID document 1010.

In operation, the DID creation module 1130 accesses a registrar 1110 that is configured to the specific distributed ledger that will be recording the transactions related to the DID 1005. The DID creation module 1130 uses the registrar 1110 to record DID hash 1031, DID hash 1041, and DID hash 1051 in the distributed ledger in the manner previously described, and to store the DID document 1010 in the manner previously described. This process may use the public key 1007 in the hash generation.

In some embodiments, the DID management module 1120 may include an ownership module 1140. The ownership module 1140 may provide mechanisms that ensure that the DID owner 1001 is in sole control of the DID 1005. In this way, the provider of the DID management module 1120 is able to ensure that the provider does not control the DID 1005, but is only providing the management services.

The key generation module 1150 generates the private key 1006 and public key 1007 pair and the public key 1007 is then recorded in the DID document 1010. Accordingly, the public key 1007 may be used by all devices associated with the DID owner 1001 and all third parties that desire to provide services to the DID owner 1001. Accordingly, when the DID owner 1001 desires to associate a new device with the DID 1005, the DID owner 1001 may execute the DID creation module 1130 on the new device. The DID creation module 1130 may then use the registrar 1110 to update the DID document 1010 to reflect that the new device is now associated with the DID 1005, which update would be reflected in a transaction on the distributed ledger 1020.

In some embodiments, however, it may be advantageous to have a public key per device 1101 owned by the DID owner 1001 as this may allow the DID owner 1001 to sign with the device-specific public key without having to access a general public key. In other words, since the DID owner 1001 will use different devices at different times (for example using a mobile phone in one instance and then using a laptop computer in another instance), it is advantageous to have a key associated with each device to provide efficiencies in signing using the keys. Accordingly, in such embodiments, the key generation module 1150 generates additional public keys 1008 and 1009 when the additional devices execute the DID creation module 1130. These additional public keys may be associated with the private key 1006 or in some instances may be paired with a new private key.

In those embodiments where the additional public keys 1008 and 1009 are associated with different devices, the additional public keys 1008 and 1009 are recorded in the DID document 1010 as being associated with those devices, as shown in FIG. 11. The DID document 1010 may include the information (information 1005, 1007 and 1011 through 1016) previously described in relation to FIG. 10 in addition to the information (information 1008, 1009 and 1165) shown in FIG. 11. If the DID document 1010 existed prior to the device-specific public keys being generated, then the DID document 1010 would be updated by the creation module 1130 via the registrar 1110 and this would be reflected in an updated transaction on the distributed ledger 1020.

In some embodiments, the DID owner 1001 may desire to keep secret the association of a device with a public key or the association of a device with the DID 1005. Accordingly, the DID creation module 1130 may cause that such data be secretly shown in the DID document 1010.

As described thus far, the DID 1005 has been associated with all the devices under the control of the DID owner 1001, even when the devices have their own public keys. However, in some embodiments, each device or some subset of devices under the control of the DID owner 1001 may each have their own DID. Thus, in some embodiments the DID creation module 1130 may generate an additional DID, for example DID 1131, for each device. The DID creation module 1130 would then generate private and public key pairs and DID documents for each of the devices and have them recorded on the distributed ledger 1020 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 1006 is totally in the control of the DID owner 1001, the private key 1006 is created on the user device 1101, browser 1102, or operating system 1103 that is owned or controlled by the DID owner 1001 that executed the DID management module 1120. In this way, there is little chance that a third party (and most consequentially, the provider of the DID management module 1120) will gain control of the private key 1006.

However, there is a chance that the device storing the private key 1006 may be lost by the DID owner 1001, which may cause the DID owner 1001 to lose access to the DID 1005. Accordingly, in some embodiments, the UI 1135 includes the option to allow the DID owner 1001 to export the private key 1006 to an off device secured database 1105 that is under the control of the DID owner 1001. As an example, the database 1105 may be one of the identity hubs 1210 described below with respect to FIG. 12. A storage module 1180 is configured to store data (such as the private key 1006 or attestations made by or about the DID owner 1001) off device in the database 1105 or identity hubs 1210. In some embodiments, the private key 1006 is stored as a QR code that is scanned by the DID owner 1001.

In other embodiments, the DID management module 1120 may include a recovery module 1160 that may be used to recover a lost private key 1006. In operation, the recovery module 1160 allows the DID owner 1001 to select one or more recovery mechanisms 1165 at the time the DID 1005 is created that may later be used to recover the lost private key. In those embodiments having the UI 1135, the UI 1135 may allow the DID owner 1001 to provide information that will be used by the one or more recovery mechanisms 1165 during recovery. The recovery module 1160 may then be run on any device associated with the DID 1005.

The DID management module 1120 may also include a revocation module 1170 that is used to revoke or sever a device from the DID 1005. In operation, the revocation module uses the UI element 1135, which allows the DID owner 1001 to indicate a desire to remove a device from being associated with the DID 1005. In one embodiment, the revocation module 1170 accesses the DID document 1010 and causes that all references to the device be removed from the DID document 1010. Alternatively, the public key for the device may be removed, and this change is then reflected in the DID document 1010 may then be reflected as an updated transaction on the distributed ledger 1020.

Because the principles described herein are performed in the context of a computing system, some introductory discussion of a computing system will be described with respect to FIG. 12. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 12:
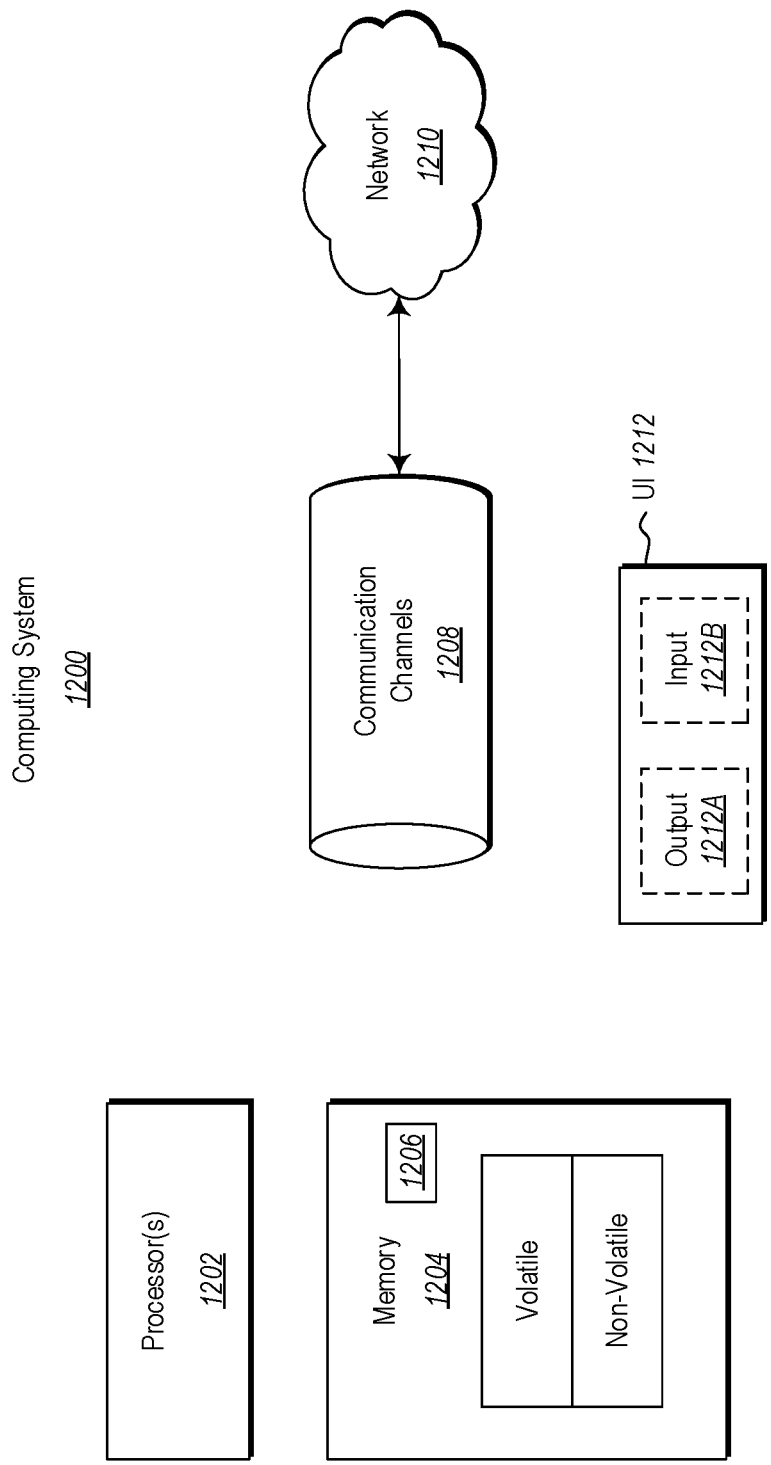
FIG. 12 illustrates an example computing system in which the principles described herein may be employed.

As illustrated in FIG. 12, in its most basic configuration, a computing system 1200 includes at least one hardware processing unit 1202 and memory 1204. The processing unit 1202 includes a general-purpose processor. Although not required, the processing unit 1202 may also include a field programmable gate array (FPGA), an application specific integrated circuit (ASIC), or any other specialized circuit. In one embodiment, the memory 1204 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1200 also has thereon multiple structures often referred to as an "executable component". For instance, the memory 1204 of the computing system 1200 is illustrated as including executable component 1206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1204 of the computing system 1200. Computing system 1200 may also contain communication channels 1208 that allow the computing system 1200 to communicate with other computing systems over, for example, network 1210.

While not all computing systems require a user interface, in some embodiments, the computing system 1200 includes a user interface system 1212 for use in interfacing with a user. The user interface system 1212 may include output mechanisms 1212A as well as input mechanisms 1212B. The principles described herein are not limited to the precise output mechanisms 1212A or input mechanisms 1212B as such will depend on the nature of the device. However, output mechanisms 1212A might include, for instance, speakers, displays, tactile output, virtual or augmented reality, holograms and so forth. Examples of input mechanisms 1212B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system for presenting a verifiable credential so that usage of the verifiable credential can be monitored by a user, the computing system comprising:
   one or more processors; and
   one or more computer-readable media having thereon computer-executable instructions that are structured such that, when executed by the one or more processors, cause the computing system to perform a method for presenting a verifiable credential, the method comprising:
      representing a verifiable credential within a data structure, the verifiable credential including a plurality of verifiable claims;
      monitoring usage of the verifiable credential to at least identify a frequency with which the verifiable credential is exposed to relying party computing systems, an identity of a relying party computing system to which the verifiable credential was last exposed, a time that the verifiable credential was last exposed, and a response indicating whether the verifiable credential was verified;
      storing usage data of the verifiable credential also in the data structure, such that as usage of the verifiable credential changes or progresses, the stored usage data also changes, wherein the usage data at least includes the frequency with which the verifiable credential is exposed to relying party computing systems, the identity of the relying party computing system to which the verifiable credential was last exposed, the time that the verifiable credential was last exposed, and the response indicating whether the verifiable credential was verified; and
      using the data structure to:
         cause a visual representation of the verifiable credential to be displayed to a user, the visual representation representing a property name and value for each of at least a subset of the plurality of verifiable claims; and
at least selectively cause at least the frequency with which the verifiable credential is exposed to relying party computing systems, the identity of the relying party computing system to which the verifiable credential was last exposed, the time that the verifiable credential was last exposed, and the response indicating whether the verifiable credential was verified which is stored in the usage data to be presented to the user.

2. The computing system of claim 1, the visual representation comprising a human readable visual representation of the property name and value for each of the subset of verifiable claims.

3. The computing system of claim 1, the visual representation comprising a bar code or QR code representation of the property name and value for each of the subset of verifiable claims.

4. The computing system of claim 1, the visual representation comprising a bar code or QR code representation of instructions for verifying one or more of the plurality of verifiable claims.

5. The computing system of claim 1, at least one of the subset of verifiable claims having a subject referenced by a decentralized identifier.

6. A method for presenting a verifiable credential so that usage of the verifiable credential can be monitored by a user, the method comprising:
representing a verifiable credential within a data structure, the verifiable credential including a plurality of verifiable claims;
monitoring usage of the verifiable credential to at least identify a frequency with which the verifiable credential is exposed to relying party computing systems, an identity of a relying party computing system to which the verifiable credential was last exposed, a time that the verifiable credential was last exposed, and a response indicating whether the verifiable credential was verified;
storing usage data of the verifiable credential also in the data structure, such that as usage of the verifiable credential changes or progresses, the stored usage data also changes, wherein the usage data at least includes the frequency with which the verifiable credential is exposed to relying party computing systems, the identity of the relying party computing system to which the verifiable credential was last exposed, the time that the verifiable credential was last exposed, and the response indicating whether the verifiable credential was verified; and
using the data structure to:
cause a visual representation of the verifiable credential to be displayed to a user, the visual representation representing a property name and value for each of at least a subset of the plurality of verifiable claims; and
at least selectively cause at least the frequency with which the verifiable credential is exposed to relying party computing systems, the identity of a relying party computing system to which the verifiable credential was last exposed, the time that the verifiable credential was last exposed, and the response indicating whether the verifiable credential was verified which is stored in the usage data to be presented to the user.

7. The method of claim 6, the visual representation comprising a human readable visual representation of the property name and value for each of the subset of verifiable claims.

8. The method of claim 6, the visual representation comprising a bar code or QR code representation of the property name and value for each of the subset of verifiable claims.

9. The method of claim 6, the visual representation comprising a bar code or QR code representation of instructions for verifying one or more of the plurality of verifiable claims.

10. The method of claim 6, at least one of the subset of verifiable claims having a subject referenced by a decentralized identifier.

11. A computer program product comprising one or more computer-readable media having thereon computer-executable instructions that are structured such that, when executed by a processor of a computing system, cause the computing system to perform a method for presenting a verifiable credential so that usage of the verifiable credential can be monitored by a user, the method comprising:
representing a verifiable credential within a data structure, the verifiable credential including a plurality of verifiable claims;
monitoring usage of the verifiable credential to at least identify a frequency with which the verifiable credential is exposed to relying party computing systems, an identity of a relying party computing system to which the verifiable credential was last exposed, a time that the verifiable credential was last exposed, and a response indicating whether the verifiable credential was verified;
storing usage data of the verifiable credential also in the data structure, such that as usage of the verifiable credential changes or progresses, the stored usage data also changes, wherein the usage data at least includes the frequency with which the verifiable credential is exposed to relying party computing systems, the identity of the relying party computing system to which the verifiable credential was last exposed, the time that the verifiable credential was last exposed, and the response indicating whether the verifiable credential was verified; and
using the data structure to:
cause a visual representation of the verifiable credential to be displayed to a user, the visual representation representing a property name and value for each of at least a subset of the plurality of verifiable claims; and
at least selectively cause at least the frequency with which the verifiable credential is exposed to relying party computing systems, the identity of a relying party computing system to which the verifiable credential was last exposed, the time that the verifiable credential was last exposed, and the response indicating whether the verifiable credential was verified which is stored in the usage data to be presented to the user.

12. The computer program product of claim 11, the visual representation comprising a human readable visual representation of the property name and value for each of the subset of verifiable claims.

13. The computer program product of claim 11, at least one of the subset of verifiable claims having a subject referenced by a decentralized identifier.

* * * * *